(12) United States Patent
Islam et al.

(10) Patent No.: US 12,127,246 B2
(45) Date of Patent: Oct. 22, 2024

(54) DIFFERENT CONFIGURATIONS FOR MESSAGE CONTENT AND TRANSMISSION IN A RANDOM ACCESS PROCEDURE

(71) Applicant: QUALCOMM Incorporated, San Diego, CA (US)

(72) Inventors: Muhammad Nazmul Islam, Littleton, MA (US); Navid Abedini, Basking Ridge, NJ (US); Bilal Sadiq, Southlake, TX (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/332,832

(22) Filed: Jun. 12, 2023

(65) Prior Publication Data

US 2023/0413319 A1    Dec. 21, 2023

Related U.S. Application Data

(63) Continuation of application No. 16/059,946, filed on Aug. 9, 2018, now Pat. No. 11,723,063.

(Continued)

(51) Int. Cl.
*H04W 74/00* (2009.01)
*H04L 5/00* (2006.01)
(Continued)

(52) U.S. Cl.
CPC ......... *H04W 74/006* (2013.01); *H04L 5/0048* (2013.01); *H04W 36/0066* (2013.01);
(Continued)

(58) Field of Classification Search
CPC .................................................. H04W 74/006
See application file for complete search history.

(56) References Cited

U.S. PATENT DOCUMENTS

| 8,448,037 B2 | 5/2013 | Bergquist et al. |
| 8,462,688 B1 | 6/2013 | Dinan |

(Continued)

FOREIGN PATENT DOCUMENTS

| WO | 2015016754 A1 | 2/2015 |
| WO | 2015135203 A1 | 9/2015 |

(Continued)

OTHER PUBLICATIONS

Asustek: "Discussion on Random Access for Beam Recovery Request", R2-1709318 (Revision of R2-1707086), 3GPP TSG-RAN WG2 Meeting #99, Berlin, Germany, Aug. 21-25, 2017, 2 pages.

(Continued)

*Primary Examiner* — Guang W Li
(74) *Attorney, Agent, or Firm* — Holland & Hart / Qualcomm

(57) ABSTRACT

Methods, systems, and devices for wireless communication are described. In some wireless systems, a base station may configure a user equipment (UE) for random access (RACH) message transmission in dedicated RACH resources during, for example, a handover process. The contention-free random access (CFRA) resources may allow the UE to transmit RACH messages at a higher transmission power than contention-based random access (CBRA) resources. The base station may indicate, to the UE, RACH transmission parameters for CFRA that are different than parameters for CBRA. These parameters may include configuration information, frequency division multiplexing information, RACH retransmission parameters, target received power, response window length, etc. The UE may use the indicated RACH transmission parameters to transmit a RACH message to the base station. The base station may respond with a RACH (Continued)

response message, and the base station and UE may synchronize upon completion of the RACH procedure.

20 Claims, 20 Drawing Sheets

Related U.S. Application Data

(60) Provisional application No. 62/630,610, filed on Feb. 14, 2018, provisional application No. 62/550,561, filed on Aug. 25, 2017, provisional application No. 62/544,756, filed on Aug. 11, 2017.

(51) Int. Cl.
  *H04W 36/00* (2009.01)
  *H04W 52/28* (2009.01)
  *H04W 74/04* (2009.01)
  *H04W 74/08* (2009.01)
  *H04W 74/0833* (2024.01)

(52) U.S. Cl.
  CPC ....... *H04W 52/281* (2013.01); *H04W 74/008* (2013.01); *H04W 74/04* (2013.01); *H04W 74/0833* (2013.01); *H04W 74/0866* (2013.01)

(56) References Cited

U.S. PATENT DOCUMENTS

| | | | |
|---|---|---|---|
| 10,405,281 B1 | 9/2019 | Pawar et al. | |
| 10,455,589 B2 | 10/2019 | Park et al. | |
| 2013/0016602 A1 | 1/2013 | Diachina et al. | |
| 2013/0064224 A1* | 3/2013 | Wang | H04W 36/0055 370/331 |
| 2014/0334448 A1 | 11/2014 | Langereis et al. | |
| 2014/0362794 A1* | 12/2014 | Zhao | H04W 74/0858 370/329 |
| 2015/0229639 A1* | 8/2015 | Abdulrahiman | H04L 63/0853 455/411 |
| 2017/0078933 A1* | 3/2017 | Li | H04W 36/0077 |
| 2017/0094689 A1 | 3/2017 | Lin et al. | |
| 2017/0231011 A1 | 8/2017 | Park et al. | |
| 2017/0303224 A1 | 10/2017 | Choi et al. | |
| 2017/0331577 A1* | 11/2017 | Parkvall | H04L 5/1469 |
| 2017/0367120 A1* | 12/2017 | Murray | H04B 7/0695 |
| 2018/0077696 A1 | 3/2018 | Lee et al. | |
| 2018/0109976 A1 | 4/2018 | Ly et al. | |
| 2018/0205516 A1 | 7/2018 | Jung et al. | |
| 2018/0255586 A1* | 9/2018 | Einhaus | H04L 5/00 |
| 2018/0279157 A1* | 9/2018 | Dinan | H04W 52/46 |
| 2018/0279376 A1* | 9/2018 | Dinan | H04W 52/50 |
| 2018/0324716 A1* | 11/2018 | Jeon | H04W 74/0833 |
| 2018/0324850 A1 | 11/2018 | Amuru et al. | |
| 2018/0324853 A1 | 11/2018 | Jeon et al. | |
| 2018/0324872 A1 | 11/2018 | Babaei et al. | |
| 2019/0007993 A1 | 1/2019 | Bergquist et al. | |
| 2019/0053171 A1 | 2/2019 | Jung et al. | |
| 2019/0053271 A1 | 2/2019 | Islam et al. | |
| 2019/0159265 A1* | 5/2019 | Takeda | H04W 74/08 |
| 2020/0154326 A1 | 5/2020 | Deenoo et al. | |
| 2020/0275319 A1 | 8/2020 | Murray et al. | |

FOREIGN PATENT DOCUMENTS

| | | | |
|---|---|---|---|
| WO | 2016086144 A1 | 6/2016 | |
| WO | 2017135803 A1 | 8/2017 | |

OTHER PUBLICATIONS

Intel Corporation: "Basic Handover Procedure in NR," 3GPP Draft; R2-1707012, 3rd Generation Partnership Project (3GPP), Mobile Competence Centre; 650, Route Des Lucioles; F-06921, Sophia-Antipolis Cedex; France, vol. RAN WG2, No. Qingdao, China; Jun. 27, 2017-Jun. 29, 2017, Jun. 26, 2017, XP051301509, 7 Pages, Retrieved from the Internet: URL: http://www.3gpp.org/ftp/Meetings_3GPP_SYNC/RAN2/Docs/ [retrieved on Jun. 26, 2017].

International Search Report and Written Opinion—PCT/US2018/046310—ISA/EPO—Nov. 20, 2018.

Lenovo, et al., "Resource Configuration for Beam Failure Recovery Request," 3GPP TSG-RAN WG2 Meeting#AH, 3GPP Draft; R2-1706905, Resource Configuration for Beam Failure Recovery Request, 3rd Generation Partnership Project (3GPP), Mobile Competence Centre; 650, Route Des Lucioles; F-06921 Sophia-Antipoli, vol. RAN WG2, No. Qingdao, China; Jun. 27, 2017-Jun. 29, 2017, Jun. 16, 2017, XP051306662, 4 pages.

NTT Docomo, et al., "Design for RACH Preamble for NR," 3GPP Draft; R1-167377 RACH Preamble for NR, 3rd Generation Partnership Project (3GPP), Mobile Competence Centre; 650, Route Des Lucioles; F-06921 Sophia-Antipolis Cedex; France, vol. RAN WG1, No. Goteborg; Aug. 22, 2016-Aug. 26, 2016, Aug. 21, 2016, XP051125873, 7 pages, Retrieved from the Internet: URL: http://www.3gpp.org/ftp/Meetings_3GPP_SYNC/RAN1/Docs/ [retrieved on Aug. 21, 2016].

Qualcomm Incorporated: "PRACH Procedure Considerations", 3GPP TSG-RAN WG1 Meeting #90bis, R1-1718532 PRACH Procedure Considerations, 3rd Generation Partnership Project, Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017, XP051341714, 13 Pages.

ZTE Corporation, et al., "Discussion on the Beam Failure Recovery Impact on RAN2", 3GPP Draft, 3GPP TSG-RAN WG2 Meeting #100, R2-1713954 (revision of R2-1713406), Discussion on the Beam Failure Recovery Impact on RAN2, 3rd Generation Partnership Project (3GPP), Mobile Competence Centre, 650, Route Des Lucioles, F-06921 Sophia-Antipolis, vol. RAN WG2, No. Reno, USA, Nov. 27, 2017-Dec. 1, 2017, Nov. 16, 2017 (Nov. 16, 2017), XP051371229, 13 Pages.

* cited by examiner

DIFFERENT CONFIGURATIONS FOR MESSAGE CONTENT AND TRANSMISSION IN A RANDOM ACCESS PROCEDURE

CROSS REFERENCES

The present application for patent is a Continuation of U.S. patent application Ser. No. 16/059,946, filed on Aug. 9, 2018, which claims priority to U.S. Provisional patent Application No. 62/544,756 by Islam, et al., entitled "Different Configurations for a Dedicated Time/Frequency Domain Random Access Channel," filed Aug. 11, 2017, U.S. Provisional Patent Application No. 62/550,561 by Islam, et al., entitled "Different Configurations for Message Content and Transmission in a Random Access Procedure," filed Aug. 25, 2017, and U.S. Provisional Patent Application No. 62/630,610 by Islam, et al., entitled "Different Configurations for Message Content and Transmission in a Random Access Procedure," filed Feb. 14, 2018, assigned to the assignee hereof, and expressly incorporated by reference herein.

BACKGROUND

The following relates generally to wireless communication, and more specifically to different configurations for message content and transmission in a random access procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications between two wireless nodes (e.g., between a base station and a UE) may use beams or beam-formed signals for transmission and/or reception. A base station may transmit beam-formed synchronization signals on downlink synchronization beams. A UE may receive a synchronization signal on one or more of the downlink synchronization beams, and thus be enabled to initiate a random access channel (RACH) procedure with the base station. In some instances, the UE may select one of a set of random access preamble sequences and send the selected preamble sequence to the base station as part of the RACH procedure. The UE may send the preamble sequence using an uplink transmission beam, and the base station may receive the transmission using an uplink reception beam. In some cases, another UE may select and transmit the same preamble sequence, potentially resulting in a collision. Conventional RACH procedures limit a UE to only transmitting one of a set of random access preamble sequences to initiate a RACH procedure. Conventional RACH procedures may experience collisions and use random access preamble sequences that only provide a limited amount of information thereby extending the amount of time required for establishing connectivity with a base station.

SUMMARY

The described techniques relate to improved methods, systems, devices, or apparatuses that support different configurations for message content and transmission in a random access procedure. Generally, the described techniques provide for configuring a user equipment (UE) to transmit different configurations of random access channel (RACH) messages for contention-free random access (CFRA) procedures and for contention-based random access (CBRA) procedures. For example, a base station may indicate one or more RACH transmission parameters to a UE (e.g., in a configuration message) for a CFRA procedure, that differ from one or more RACH transmission parameters for a CBRA (e.g., a value for a transmission parameter for CFRA may be different from the value for the transmission parameter for CBRA). These transmission parameters may include a physical RACH (PRACH) configuration index, a number of RACH transmission opportunities that can be frequency division multiplexed in a single time instance, a frequency offset of a lowest RACH transmission occasion, a zero correlation zone configuration, a RACH received target power, a maximum number of RACH preamble retransmissions, a power ramping step for RACH preamble retransmissions, a random access response window, or some combination of these or other similar parameters. In some cases, the transmission parameters may be different based on the CFRA procedure having a lower likelihood of experiencing interference than the CBRA procedure.

Additionally or alternatively, the transmission parameters may be different for dedicated RACH resources as opposed to common RACH resources, or for different synchronization signal blocks (SSBs) or channel state information reference signals (CSI-RSs). The UE may generate the RACH message based on the configuration message received from the base station and may transmit the RACH message to the base station based on indicated transmission parameter(s). The base station may receive the RACH message, and may transmit a RACH response to the UE. Based on the RACH response, the UE may establish a connection with the base station (e.g., for the serving cell). Beneficially, the techniques described herein may reduce latency in the RACH procedure.

In some cases, the base station may configure UEs for different RACH message configurations (e.g., different RACH transmission parameters or RACH message parameters) for dedicated resources as opposed to contention-free resources. The UE may more quickly establish connectivity with a base station as the UE may utilize the dedicated resources to provide additional information in an initial RACH message, and may use different transmission techniques making the transmitted RACH easier for the base station to receive. In an example, a base station may assign dedicated RACH resources to a UE, and may configure the UE for RACH message transmission in the dedicated RACH resources. For example, this procedure may occur during a handover process of the UE from a serving cell to a neighbor cell. Because the UE is allocated dedicated RACH resources, the UE may transmit RACH messages at a higher power than the UE could for contention-based RACH resources. The base station may indicate in a configuration message (e.g., a handover command) one or more transmission parameters.

A method of wireless communication by a UE is described. The method may include receiving, from a base station, a first RACH transmission parameter for a CFRA procedure that differs from a second RACH transmission parameter for a CBRA procedure, generating a RACH message for the CFRA procedure, and transmitting, based at least in part on the first RACH transmission parameter, the RACH message in the CFRA procedure.

An apparatus for wireless communication by a UE is described. The apparatus may include means for receiving, from a base station, a first RACH transmission parameter for a CFRA procedure that differs from a second RACH transmission parameter for a CBRA procedure, means for generating a RACH message for the CFRA procedure, and means for transmitting, based at least in part on the first RACH transmission parameter, the RACH message in the CFRA procedure.

Another apparatus for wireless communication by a UE is described. The apparatus may include a processor, memory in electronic communication with the processor, and instructions stored in the memory. The instructions may be operable to cause the processor to receive, from a base station, a first RACH transmission parameter for a CFRA procedure that differs from a second RACH transmission parameter for a CBRA procedure, generate a RACH message for the CFRA procedure, and transmit, based at least in part on the first RACH transmission parameter, the RACH message in the CFRA procedure.

A non-transitory computer readable medium for wireless communication by a UE is described. The non-transitory computer-readable medium may include instructions operable to cause a processor to receive, from a base station, a first RACH transmission parameter for a CFRA procedure that differs from a second RACH transmission parameter for a CBRA procedure, generate a RACH message for the CFRA procedure, and transmit, based at least in part on the first RACH transmission parameter, the RACH message in the CFRA procedure.

In some examples of the method, apparatus, and non-transitory computer-readable medium described above, transmitting the RACH message in the CFRA procedure includes transmitting the RACH message within a dedicated time and frequency resource. In some examples of the method, apparatus, and non-transitory computer-readable medium described above, transmitting the RACH message in the CFRA procedure further includes transmitting the RACH message in a directional transmission.

In some examples of the method, apparatus, and non-transitory computer-readable medium described above, the first RACH transmission parameter indicates an assigned tone spacing for RACH message transmission within the dedicated time and frequency resource, wherein transmitting the RACH message includes transmitting the RACH message using the assigned tone spacing. In some examples of the method, apparatus, and non-transitory computer-readable medium described above, the assigned tone spacing may be different from a second assigned tone spacing for RACH message transmission within a common time and frequency resource.

In some examples of the method, apparatus, and non-transitory computer-readable medium described above, the first RACH transmission parameter may indicate a root sequence, or a zero correlation zone configuration, or a random access response search space, or a random access response control resource set (CORESET), or a random access response window, or a maximum number of preamble retransmissions, or a power ramping step, or a RACH received target power, or restricted set configurations, or a subcarrier spacing for the RACH message, or a reference signal received power (RSRP) threshold for selecting an SSB, or an RSRP threshold for selecting a CSI-RS, or any combination thereof.

That is, specifically, in some examples of the method, apparatus, and non-transitory computer-readable medium described above, the first RACH transmission parameter indicates a PRACH configuration index. In some examples of the method, apparatus, and non-transitory computer-readable medium described above, the first RACH transmission parameter indicates a number of RACH transmission opportunities available for frequency division multiplexing in a single time instance. Additionally or alternatively, in some examples of the method, apparatus, and non-transitory computer-readable medium described above, the first RACH transmission parameter indicates a frequency offset of a lowest RACH transmission occasion. In some cases, in the method, apparatus, and non-transitory computer-readable medium described above, the first RACH transmission parameter indicates a zero correlation zone configuration.

Furthermore, in some examples of the method, apparatus, and non-transitory computer-readable medium described above, the first RACH transmission parameter indicates a RACH received target power. In some examples of the method, apparatus, and non-transitory computer-readable medium described above, the first RACH transmission parameter indicates a maximum number of RACH preamble retransmissions. Additionally or alternatively, the first RACH transmission parameter indicates a power ramping step for RACH preamble retransmissions. In some cases, in the method, apparatus, and non-transitory computer-readable medium described above, the first RACH transmission parameter indicates a random access response window length. In some cases, in the method, apparatus, and non-transitory computer-readable medium described above, the first RACH transmission parameter indicates some combination of the above parameters.

In some examples of the method, apparatus, and non-transitory computer-readable medium described above, receiving the first RACH transmission parameter comprises receiving, from the base station, a configuration message for the RACH message, where the configuration message indicates the first RACH transmission parameter.

In some examples of the method, apparatus, and non-transitory computer-readable medium described above, the configuration message may be a handover message. In some examples of the method, apparatus, and non-transitory computer-readable medium described above, transmitting the RACH message comprises transmitting the RACH message in at least one additional directional transmission.

In some examples of the method, apparatus, and non-transitory computer-readable medium described above, generating the RACH message may be based at least in part on the configuration message. Generating the RACH message may further include processing the configuration message to identify a first subset of RACH preambles for the CFRA procedure, and selecting a RACH preamble for the RACH message from the first subset of RACH preambles, where the first subset of RACH preambles differs from a second subset of RACH preambles for the CBRA procedure.

In some examples of the method, apparatus, and non-transitory computer-readable medium described above, the first RACH transmission parameter for the CFRA procedure may correspond to a dedicated RACH preamble within a dedicated time and frequency resource. In some examples of the method, apparatus, and non-transitory computer-readable medium described above, the first RACH transmission parameter may differ from a third RACH transmission parameter for a CFRA procedure that may correspond to a dedicated RACH preamble within a common time and frequency resource.

In some examples of the method, apparatus, and non-transitory computer-readable medium described above, the first RACH transmission parameter may correspond to a dedicated RACH preamble within a dedicated time and frequency resource that is associated with a first SSB. In some examples of the method, apparatus, and non-transitory computer-readable medium described above, the second RACH transmission parameter may correspond to a dedicated RACH preamble within a common time and frequency resource that is associated with a second SSB.

In some examples of the method, apparatus, and non-transitory computer-readable medium described above, the first RACH transmission parameter may correspond to a dedicated RACH preamble within a dedicated time and frequency resource that is associated with a first CSI-RS. In some examples of the method, apparatus, and non-transitory computer-readable medium described above, the second transmission parameter may correspond to a dedicated RACH preamble within a common time and frequency resource that is associated with a second CSI-RS.

Some examples of the method, apparatus, and non-transitory computer-readable medium described above may further include processes, features, means, or instructions for monitoring for a random access response in a random access response window based at least in part on an interleaving pattern. In some examples of the method, apparatus, and non-transitory computer-readable medium described above, monitoring for the random access response further involves monitoring for the random access response using a first receive beam in a first portion of the random access response window and a second receive beam in a second portion of the random access response window.

In some examples of the method, apparatus, and non-transitory computer-readable medium described above, the first RACH transmission parameter may be generated by a target base station that differs from the base station.

In some examples of the method, apparatus, and non-transitory computer-readable medium described above, the RACH message may be an example of a RACH Msg1 or a RACH preamble.

In some examples of the method, apparatus, and non-transitory computer-readable medium described above, transmitting the RACH message involves transmitting the RACH message using a transmission power indicated by the first RACH transmission parameter.

In some examples of the method, apparatus, and non-transitory computer-readable medium described above, the transmission power may be derived based at least in part on one or more prior reports for the UE, the one or more prior reports indicating cell quality associated with a target base station. In some examples of the method, apparatus, and non-transitory computer-readable medium described above, the one or more prior reports include beam quality measurements for a set of different beams of the target base station, where the cell quality may be based at least in part on the beam quality measurements.

Some examples of the method, apparatus, and non-transitory computer-readable medium described above may further include processes, features, means, or instructions for selecting at least one index from a set of indices, where the content comprises an instruction to include the at least one index in a payload of the RACH message.

In some examples of the method, apparatus, and non-transitory computer-readable medium described above, the at least one index is an example of at least one beam index from a set of base station beam indices, and where transmitting the RACH message involves transmitting the RACH message at a transmission time to convey the at least one beam index or to implicitly identify a second beam index that differs from the at least one index.

Some examples of the method, apparatus, and non-transitory computer-readable medium described above may further include processes, features, means, or instructions for receiving a random access response via a downlink transmit beam that corresponds to the at least one beam index or the second beam index.

Some examples of the method, apparatus, and non-transitory computer-readable medium described above may further include processes, features, means, or instructions for selecting, for the RACH message, a preamble from a set of preambles based at least in part on the selected at least one index.

In some examples of the method, apparatus, and non-transitory computer-readable medium described above, selecting the at least one index includes selecting the at least one index based at least in part on a ranking of reference signal received power measurements for a set of reference signals received from the base station.

In some examples of the method, apparatus, and non-transitory computer-readable medium described above, the at least one index may be one of an SSB index, or a CSI-RS block index, or a beam index.

In some examples of the method, apparatus, and non-transitory computer-readable medium described above, selecting the at least one index involves selecting the at least one index based at least in part on a directional transmission power restriction.

Some examples of the method, apparatus, and non-transitory computer-readable medium described above may further include processes, features, means, or instructions for processing at least one of a master information block (MIB), or a system information block (SIB), or remaining minimum system information (RMSI), or a handover message, or any combination thereof, to identify the interleaving pattern of the random access response window.

Some examples of the method, apparatus, and non-transitory computer-readable medium described above may further include processes, features, means, or instructions for selecting, for the RACH message, a preamble from a set of preambles based at least in part on the selected at least one index.

In some examples of the method, apparatus, and non-transitory computer-readable medium described above, selecting the at least one index involves selecting the at least one index based at least in part on a ranking of reference signal received power measurements for a set of reference signals received from the base station. In some examples of the method, apparatus, and non-transitory computer-readable medium described above, the at least one index may be one of a synchronization signal block index, or a CSI-RS block index, or a beam index.

In some examples of the method, apparatus, and non-transitory computer-readable medium described above, the content indicates a reference signal type of a set of different reference signal types, where transmitting the RACH message includes transmitting a reference signal having the indicated reference signal type. In some examples of the method, apparatus, and non-transitory computer-readable medium described above, the indicated reference signal type may be one of a Zadoff-Chu sequence, or a maximum length sequence, or a pseudo-random binary sequence, or a quadrature phase shift keying sequence.

In some examples of the method, apparatus, and non-transitory computer-readable medium described above, the first RACH transmission parameter indicates a modulation scheme of a set of different modulation schemes, where transmitting the RACH message includes transmitting the RACH message using the indicated modulation scheme.

In some examples of the method, apparatus, and non-transitory computer-readable medium described above, the first RACH transmission parameter indicates a number of waveforms to use in the directional transmission, where transmitting the RACH message includes transmitting the RACH message using the indicated number of waveforms.

In some examples of the method, apparatus, and non-transitory computer-readable medium described above, the content indicates a number of bits in the RACH message, where generating the RACH message involves generating the RACH message based at least in part on the indicated number of bits. In some examples of the method, apparatus, and non-transitory computer-readable medium described above, the number of bits may be based at least in part on a link gain of the UE.

In some examples of the method, apparatus, and non-transitory computer-readable medium described above, the content specifies to include a quality report in the RACH message where generating the RACH message involves generating the RACH message to include the quality report.

In some examples of the method, apparatus, and non-transitory computer-readable medium described above, the quality report may be a beam quality report or a cell quality report.

In some examples of the method, apparatus, and non-transitory computer-readable medium described above, the quality report may be the beam quality report, and the beam quality report may include at least one of an RSRP, or a reference signal received quality (RSRQ), or a reference signal strength indicator (RSSI), or a channel quality indicator (CQI), or a signal-to-noise ratio (SNR), or a signal to interference and noise ratio (SINR), or any combination thereof, for one or more beams.

Some examples of the method, apparatus, and non-transitory computer-readable medium described above may further include processes, features, means, or instructions for processing a random access response message that includes an uplink message parameter that corresponds to the quality report. Some examples of the method, apparatus, and non-transitory computer-readable medium described above may further include processes, features, means, or instructions for transmitting an uplink message based at least in part on the uplink message parameter.

In some examples of the method, apparatus, and non-transitory computer-readable medium described above, the uplink message parameter may be at least one of scheduling for the uplink message, or a modulation and coding scheme for the uplink message, or a power control parameter for the uplink message, or any combination thereof.

In some examples of the method, apparatus, and non-transitory computer-readable medium described above, transmitting the RACH message involves generating a signal based at least in part on time division multiplexing a reference signal and a payload. Some examples of the method, apparatus, and non-transitory computer-readable medium described above may further include processes, features, means, or instructions for transmitting the signal. Additionally or alternatively, in some examples of the method, apparatus, and non-transitory computer-readable medium described above, transmitting the RACH message involves generating a signal based at least in part on frequency division multiplexing a reference signal and a payload. Some examples of the method, apparatus, and non-transitory computer-readable medium described above may further include processes, features, means, or instructions for transmitting the signal.

Some examples of the method, apparatus, and non-transitory computer-readable medium described above may further include processes, features, means, or instructions for receiving a random access response to the RACH message. Some examples of the method, apparatus, and non-transitory computer-readable medium described above may further include processes, features, means, or instructions for establishing a connection with the base station based at least in part on the random access response.

A method of wireless communication by a base station is described. The method may include transmitting, to a UE, a first RACH transmission parameter for a CFRA procedure that differs from a second RACH transmission parameter for a CBRA procedure. The method may further include receiving, based at least in part on the first RACH transmission parameter, a RACH message in the CFRA procedure, and transmitting a random access response based at least in part on the RACH message.

An apparatus for wireless communication by a base station is described. The apparatus may include means for transmitting, to a UE, a first RACH transmission parameter for a CFRA procedure that differs from a second RACH transmission parameter for a CBRA procedure. The apparatus may further include means for receiving, based at least in part on the first RACH transmission parameter, a RACH message in the CFRA procedure, and means for transmitting a random access response based at least in part on the RACH message.

Another apparatus for wireless communication by a base station is described. The apparatus may include a processor, memory in electronic communication with the processor, and instructions stored in the memory. The instructions may be operable to cause the processor to transmit, to a UE, a first RACH transmission parameter for a CFRA procedure that differs from a second RACH transmission parameter for a CBRA procedure. The instructions may be further operable to cause the processor to receive, based at least in part on the first RACH transmission parameter, a RACH message in the CFRA procedure, and transmit a random access response based at least in part on the RACH message.

A non-transitory computer readable medium for wireless communication by a base station is described. The non-transitory computer-readable medium may include instructions operable to cause a processor to transmit, to a UE, a first RACH transmission parameter for a CFRA procedure that differs from a second RACH transmission parameter for a CBRA procedure. The non-transitory computer-readable medium may include further instructions operable to cause the processor to receive, based at least in part on the first RACH transmission parameter, a RACH message in the CFRA procedure, and transmit a random access response based at least in part on the RACH message.

In some examples of the method, apparatus, and non-transitory computer-readable medium described above, receiving the RACH message involves receiving the RACH message within a dedicated time and frequency resource. In some examples of the method, apparatus, and non-transitory computer-readable medium described above, receiving the RACH message involves receiving the RACH message in a directional transmission.

In some examples of the method, apparatus, and non-transitory computer-readable medium described above, the first RACH transmission parameter indicates an assigned tone spacing for RACH message transmission within the dedicated time and frequency resource, wherein receiving the RACH message includes receiving the RACH message using the assigned tone spacing. In some examples of the method, apparatus, and non-transitory computer-readable medium described above, the assigned tone spacing may be different from a second assigned tone spacing for RACH message transmission within a common time and frequency resource.

In some examples of the method, apparatus, and non-transitory computer-readable medium described above, the first transmission parameter may indicate a root sequence, or a zero correlation zone configuration, or a random access response search space, or a random access response CORESET, or a random access response window, or a maximum number of preamble retransmissions, or a power ramping step, or a RACH received target power, or restricted set configurations, or a subcarrier spacing for the RACH message, or a RSRP threshold for selecting a SSB, or an RSRP threshold for selecting a CSI-RS, or any combination thereof.

That is, specifically, in some examples of the method, apparatus, and non-transitory computer-readable medium described above, the first RACH transmission parameter indicates a PRACH configuration index. In some examples of the method, apparatus, and non-transitory computer-readable medium described above, the first RACH transmission parameter indicates a number of RACH transmission opportunities available for frequency division multiplexing in a single time instance. Additionally or alternatively, in some examples of the method, apparatus, and non-transitory computer-readable medium described above, the first RACH transmission parameter indicates a frequency offset of a lowest RACH transmission occasion. In some cases, in the method, apparatus, and non-transitory computer-readable medium described above, the first RACH transmission parameter indicates a zero correlation zone configuration.

Furthermore, in some examples of the method, apparatus, and non-transitory computer-readable medium described above, the first RACH transmission parameter indicates a RACH received target power. In some examples of the method, apparatus, and non-transitory computer-readable medium described above, the first RACH transmission parameter indicates a maximum number of RACH preamble retransmissions. Additionally or alternatively, the first RACH transmission parameter indicates a power ramping step for RACH preamble retransmissions. In some cases, in the method, apparatus, and non-transitory computer-readable medium described above, the first RACH transmission parameter indicates a random access response window length. In some cases, in the method, apparatus, and non-transitory computer-readable medium described above, the first RACH transmission parameter indicates some combination of the above parameters.

In some examples of the method, apparatus, and non-transitory computer-readable medium described above, transmitting the first RACH transmission parameter involves transmitting, to the UE, a configuration message for the RACH message, wherein the configuration message indicates the first RACH transmission parameter. In some examples of the method, apparatus, and non-transitory computer-readable medium described above, the configuration message may be a handover message.

In some examples of the method, apparatus, and non-transitory computer-readable medium described above, the configuration message may identify a first subset of RACH preambles for the CFRA procedure that differs from a second subset of RACH preambles for a CBRA procedure.

In some examples of the method, apparatus, and non-transitory computer-readable medium described above, the first RACH transmission parameter for the CFRA procedure may correspond to a dedicated RACH preamble within a dedicated time and frequency resource. In some examples of the method, apparatus, and non-transitory computer-readable medium described above, the first RACH transmission parameter may differ from a third RACH transmission parameter for a CFRA procedure that may correspond to a dedicated RACH preamble within a common time and frequency resource.

In some examples of the method, apparatus, and non-transitory computer-readable medium described above, the first RACH transmission parameter may correspond to a dedicated RACH preamble within a dedicated time and frequency resource that is associated with a first SSB. In some examples of the method, apparatus, and non-transitory computer-readable medium described above, the second RACH transmission parameter may correspond to a dedicated RACH preamble within a common time and frequency resource that is associated with a second SSB.

In some examples of the method, apparatus, and non-transitory computer-readable medium described above, the first RACH transmission parameter may correspond to a dedicated RACH preamble within a dedicated time and frequency resource that is associated with a first CSI-RS. In some examples of the method, apparatus, and non-transitory computer-readable medium described above, the second RACH transmission parameter may correspond to a dedicated RACH preamble within a common time and frequency resource that is associated with a second CSI-RS.

In some examples of the method, apparatus, and non-transitory computer-readable medium described above, the RACH message may be an example of a RACH Msg1 or a RACH preamble.

In some examples of the method, apparatus, and non-transitory computer-readable medium described above, configuring the UE involves transmitting an indication of the content and the first RACH transmission parameter to a serving base station of the UE for transmission of the indication of the content and the first RACH transmission parameter to the UE. Some examples of the method, apparatus, and non-transitory computer-readable medium described above may further include processes, features, means, or instructions for receiving an indication of a handover decision from the serving base station, where transmitting the indication of the content and the first RACH transmission parameter may be based at least in part on the handover decision.

Some examples of the method, apparatus, and non-transitory computer-readable medium described above may further include processes, features, means, or instructions for receiving one or more cell quality reports for the UE. Some examples of the method, apparatus, and non-transitory computer-readable medium described above may further include processes, features, means, or instructions for determining the transmission parameter based at least in part on the one or more cell quality reports. In some examples of the method, apparatus, and non-transitory computer-readable medium described above, the one or more cell quality reports include beam quality measurements for a set of different beams of the base station.

Some examples of the method, apparatus, and non-transitory computer-readable medium described above may further include processes, features, means, or instructions for deriving a transmission power based at least in part on the one or more cell quality reports. Some examples of the method, apparatus, and non-transitory computer-readable medium described above may further include processes, features, means, or instructions for selecting the transmission parameter corresponding to the derived transmission power.

Some examples of the method, apparatus, and non-transitory computer-readable medium described above may further include processes, features, means, or instructions for selecting a downlink directional transmission from a set of different downlink directional transmissions based at least in part on the at least one index, where transmitting the random access response involves transmitting the random access response using the selected downlink directional transmission.

Some examples of the method, apparatus, and non-transitory computer-readable medium described above may further include processes, features, means, or instructions for determining at least one parameter associated with the random access response based at least in part on a beam quality report included in the RACH message.

Some examples of the method, apparatus, and non-transitory computer-readable medium described above may further include processes, features, means, or instructions for determining at least one parameter associated with the random access response based at least in part on a beam index included in the RACH message.

In some examples of the method, apparatus, and non-transitory computer-readable medium described above, selecting the downlink transmission beam includes selecting the downlink transmission beam based at least in part on a defined rule.

Some examples of the method, apparatus, and non-transitory computer-readable medium described above may further include processes, features, means, or instructions for determining an interleaving pattern of a random access response window based at least in part on one of a first beam index included in the RACH message or a second beam index corresponding to a transmission time interval (TTI) in which the RACH message was transmitted, where transmitting the random access response may involve transmitting the random access response within the random access response window based at least in part on the interleaving pattern.

In some examples of the method, apparatus, and non-transitory computer-readable medium described above, configuring the UE comprises: transmitting at least one of a MIB, or a SIB, or RMSI, or a handover message, or any combination thereof, to indicate the interleaving pattern of the random access response window for configuring the UE with the interleaving pattern.

In some examples of the method, apparatus, and non-transitory computer-readable medium described above, transmitting the random access response involves transmitting the random access response within a first portion of the random access response window, or within a second portion of the random access response window, or in both of the first and second portions of the random access window.

Some examples of the method, apparatus, and non-transitory computer-readable medium described above may further include processes, features, means, or instructions for determining a load parameter for a set of different directional transmissions, where the transmission parameter indicates a transmission power for transmitting the RACH message based at least in part on the load parameter.

Some examples of the method, apparatus, and non-transitory computer-readable medium described above may further include processes, features, means, or instructions for determining a link gain of the UE. Some examples of the method, apparatus, and non-transitory computer-readable medium described above may further include processes, features, means, or instructions for selecting a number of bits for the RACH message based at least in part on the link gain, where the content identifies the number of bits for the RACH message.

In some examples of the method, apparatus, and non-transitory computer-readable medium described above, the content specifies to include a quality report in the RACH message, where receiving the RACH message includes processing the RACH message to identify the quality report.

In some examples of the method, apparatus, and non-transitory computer-readable medium described above, the quality report may be a beam quality report or a cell quality report.

In some examples of the method, apparatus, and non-transitory computer-readable medium described above, the beam quality report includes at least one of an RSRP, or an RSRQ, or an RSSI, or a CQI, or an SNR, or an SINR, or any combination thereof, for one or more beams.

Some examples of the method, apparatus, and non-transitory computer-readable medium described above may further include processes, features, means, or instructions for receiving an uplink message in accordance with the uplink message parameter.

In some examples of the method, apparatus, and non-transitory computer-readable medium described above, the uplink message parameter may be at least one of scheduling for the uplink message, or a modulation and coding scheme for the uplink message, or a power control parameter for the uplink message, or any combination thereof.

In some examples of the method, apparatus, and non-transitory computer-readable medium described above, configuring the UE further includes configuring the UE with a CFRA resource.

A further method of wireless communication by a base station is described. The method may include determining to handover a UE from the base station to a target base station, receiving, from the target base station, an indication of content for a RACH message and a transmission parameter, and transmitting, to the UE, a configuration message indicating the content for the RACH message and the transmission parameter.

An apparatus for wireless communication by a base station is described. The apparatus may include means for determining to handover a UE from the base station to a target base station, means for receiving, from the target base station, an indication of content for a RACH message and a transmission parameter, and means for transmitting, to the UE, a configuration message indicating the content for the RACH message and the transmission parameter.

Another apparatus for wireless communication by a base station is described. The apparatus may include a processor, memory in electronic communication with the processor, and instructions stored in the memory. The instructions may be operable to cause the processor to determine to handover a UE from the base station to a target base station, receive, from the target base station, an indication of content for a RACH message and a transmission parameter, and transmit, to the UE, a configuration message indicating the content for the RACH message and the transmission parameter.

A non-transitory computer readable medium for wireless communication by a base station is described. The non-transitory computer-readable medium may include instructions operable to cause a processor to determine to handover a UE from the base station to a target base station, receive, from the target base station, an indication of content for a RACH message and a transmission parameter, and transmit, to the UE, a configuration message indicating the content for the RACH message and the transmission parameter.

Some examples of the method, apparatus, and non-transitory computer-readable medium described above may further include processes, features, means, or instructions for transmitting an indication of a handover decision to the target base station, where receiving the indication of the content for the RACH message and the transmission parameter may be based at least in part on the indication of the handover decision.

Some examples of the method, apparatus, and non-transitory computer-readable medium described above may further include processes, features, means, or instructions for receiving, from the UE, a first indication of a first cell quality for the base station and second indication of a second cell quality for the target base station, where determining to handover the UE may be based at least in part on the first cell quality and the second cell quality.

In some examples of the method, apparatus, and non-transitory computer-readable medium described above, the configuration message is an example of a handover command message.

DETAILED DESCRIPTION

Figure 1:
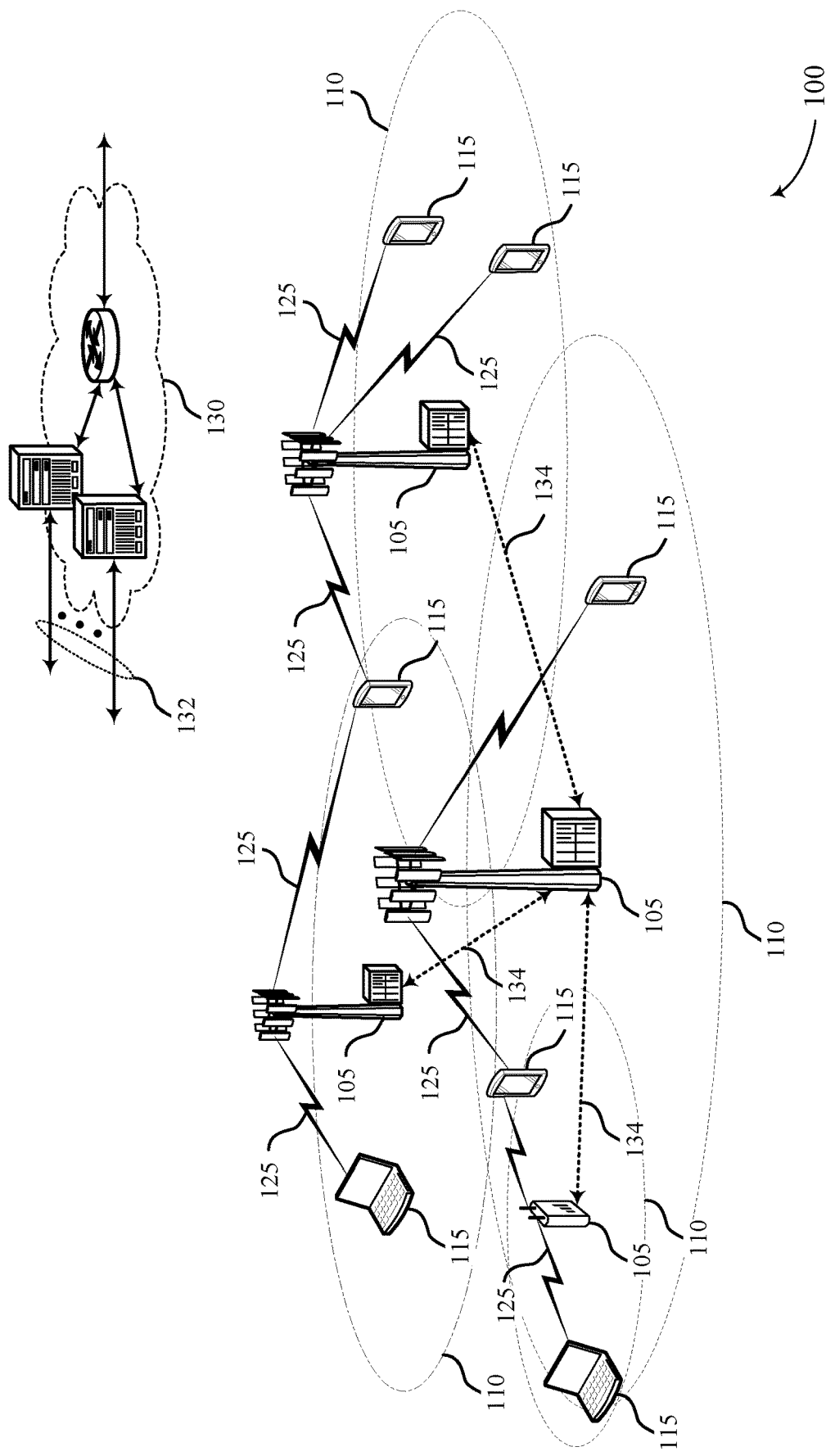
FIG. 1 illustrates an example of a wireless communications system that supports different configurations for message content and transmission in a random access procedure in accordance with aspects of the present disclosure.

The described techniques relate to improved methods, systems, devices, or apparatuses that support different configurations for transmission and message content of different types of random access channel (RACH) procedures. Generally, the described techniques provide for configuring a user equipment (UE) with different transmission parameters for contention-free random access (CFRA) procedures and contention-based random access (CBRA) procedures. That is, a UE generating and transmitting a RACH message for a CFRA procedure may use different values for one or more RACH transmission parameters than a UE generating and transmitting a RACH message for a CBRA procedure. In some cases, a base station may configure a UE to additionally or alternatively transmit different configurations of RACH messages in dedicated, contention-free time/frequency domain resources as opposed to in contention-based resources. The UE may more quickly establish connectivity with a base station as the UE may utilize the dedicated resources to provide additional information in an initial RACH message, and may use different transmission techniques and transmission parameters to make the transmitted RACH easier for the base station to receive.

In some wireless systems, UEs and base stations may use beams or beam-formed signals for transmission and/or reception. A UE may initiate an access procedure, such as a RACH procedure, by transmitting a message to a base station. This message may be an example of a RACH message, which may also be referred to as a RACH preamble message, a RACH request, or a RACH message 1 (Msg1). The base station may allocate resources for the UE to transmit the RACH message. For example, the base station may allocate dedicated RACH resources for the UE to perform a contention-free RACH procedure. In some cases, the UE may transmit a RACH message using different transmission parameters when using contention-free RACH resources as opposed to contention-based RACH resources. For example, the UE may transmit using a higher transmit power due to the lower probability of interference in resources dedicated for contention-free RACH procedures.

The UE may synchronize to a wireless network or a target cell using the RACH procedure. For example, the UE may transmit a RACH message before or during a handover procedure from a serving cell to a target neighbor cell. In some cases, a base station may send a configuration message (e.g., a handover command) to the UE in order to configure the UE for efficient RACH messaging. In the configuration message, the base station may indicate content, a transmission parameter for RACH messaging, or both. For example, the base station may transmit one or more transmission parameters for a CFRA procedure. The transmission parameters may be different than transmission parameters for a CBRA procedure, as the CFRA procedure may have a lower likelihood of experiencing interference (e.g., as CFRA resources are not used for CBRA procedures, including initial access procedures for UEs).

Additionally or alternatively, the transmission parameters for CFRA procedures may be different for dedicated RACH resources as opposed to common RACH resources, or for different synchronization signal blocks (SSBs) or channel state information (CSI) reference signals (CSI-RSs). For example, the transmission parameter may indicate a transmission power, a modulation scheme, a number of waveforms, or some combination of these or other parameters. The UE may generate the RACH message based on the configuration message and may transmit the RACH message in the dedicated RACH resources to the base station or a different base station (e.g., a target base station) based on the RACH transmission parameter(s). The base station or target base station may determine uplink beams, downlink beams, or both for communication with the UE based on the received RACH message. To complete the RACH procedure, the base station may transmit a RACH response message back to the UE, and the UE and base station may synchronize based on the RACH procedure. By implementing the configured content and RACH transmission parameters for CFRA or dedicated RACH messaging, the UE may reduce latency for the RACH procedure, as the UE may transmit more information to the base station in a single RACH message.

Aspects of the disclosure are initially described in the context of wireless communications systems. Additional aspects are described with respect to a RACH messaging configuration and a number of process flows. Aspects of the disclosure are further illustrated by and described with reference to apparatus diagrams, system diagrams, and flowcharts that relate to different configurations for message content and transmission in a random access procedure.

FIG. 1 illustrates an example of a wireless communications system 100 that supports different configurations for message content and transmission in a random access procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. A base station 105 may configure a UE 115 to transmit RACH messages, such as RACH preamble messages, using different configurations.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. CA may be used with both FDD and TDD component carriers.

During an initial access procedure, also referred to as a RACH procedure, a UE 115 may transmit a RACH message (e.g., a RACH preamble message or RACH Msg1) to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response, or RACH message 2, that provides an uplink resource grant, a timing advance, and/or a temporary cell radio network temporary identity (C-RNTI). The UE 115 may then transmit a radio resource control (RRC) connection request, or RACH message 3, along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115), the UE 115 may repeat the RACH process by transmitting a new RACH preamble.

A UE 115 may synchronize to a wireless network or cell using the RACH procedure. For example, the UE 115 may perform the RACH procedure during a handover procedure from a serving cell to a target cell. In some wireless systems (e.g., LTE systems), the network configure common time and frequency resources for transmission of RACH messages. Some may of these resources may be available for multiple UEs 115 to transmit RACH messages, for example, based on a first set of preambles. Any UE 115 may use these resources for a CBRA procedure. Other resources of the common time and frequency resources may be assigned to a specific UE 115, for example, based on a dedicated preamble index. These resources may be used by the assigned UE 115 for CFRA procedures.

However, other wireless systems (e.g., NR systems) may implement dedicated time or frequency resources separate from the common RACH resources. For example, if a base station 105 and a UE 115 are or were previously synchronized, the base station 105 may allocate dedicated RACH resources for the UE 115 to use for a RACH procedure. The base station 105 may allocate the dedicated RACH resources through RRC signaling to the UE 115. In one aspect, the base station 105 may allocate dedicated RACH resources to a UE 115 with a soon to expire or recently expired uplink synchronization. In a second aspect, the base station 105 may allocate dedicated RACH resources to a UE 115 in order to perform a handover process of the UE 115 from one cell to another. In each case, the UE 115 may transmit a RACH message in the assigned dedicated RACH resources rather than—or in addition to—the common RACH resources, which may result in reduced latency for the RACH procedure.

In some cases, the base station 105 may configure the UE 115 for the RACH transmission. For example, based on the synchronization of the base station 105 and the UE 115, the base station 105 may determine transmission content and/or parameters for a RACH message of the UE 115. The base station 105 may indicate the configuration to the UE 115, and the UE 115 may generate a RACH message based on the configuration. In some cases, the base station 105 may configure the UE 115 with transmission parameters (e.g., RACH transmission parameters) based on the type of RACH procedure for the UE 115 to perform. For example, the base station 105 may transmit an indication of different RACH transmission parameters to a UE 115 based on whether the UE 115 is performing a CFRA or CBRA procedure. The UE configuration may improve the reliability or increase the payload of the RACH message, which may correspondingly reduce the latency for the RACH procedure.

Figure 2:
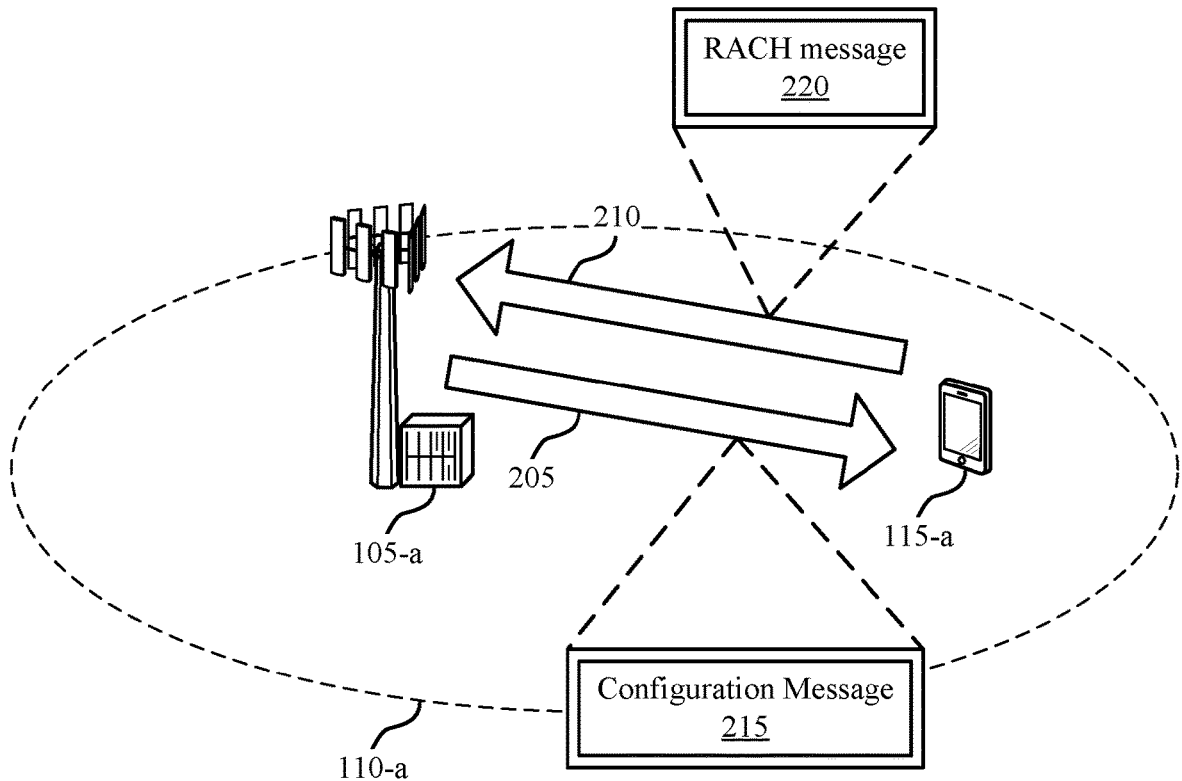
FIG. 2 illustrates an example of a wireless communication system in accordance with aspects of the present disclosure.

FIG. 2 illustrates an example of a wireless communication system 200 in accordance with various aspects of the present disclosure. The wireless communication system 200 may include base station 105-*a* and UE 115-*a*, which may be examples of a base station 105 and a UE 115, as described with reference to FIG. 1. Base station 105-*a* may provide network coverage for geographic area 110-*a*. Base station 105-*a* and UE 115-*a* may communicate using beam-formed or directional transmissions. For example, in the downlink case, base station 105-*a* may send a downlink transmission 205 to UE 115-*a*, and in the uplink case, UE 115-*a* may send an uplink transmission 210 to base station 105-*a*. The wireless communication system 200 may support different configurations for UE 115-*a* to transmit a RACH message 220 in one or more directional transmissions to base station 105-*a* to initiate a synchronization process.

In some wireless systems (e.g., NR systems), a UE 115, such as UE 115-*a*, may transmit messages in order to synchronize with a network or a cell. For example, UE 115-*a* may transmit a RACH message 220, which may be referred to as a Msg1, a RACH preamble message, or a RACH request, to base station 105-*a* to connect to the network or target cell. This transmission of the RACH message 220 may initialize a RACH procedure between UE 115-*a* and base station 105-*a*. In some cases, UE 115-*a* may transmit the RACH message 220 during a handover procedure, to gain initial access to the wireless network (e.g., from an RRC idle state), to re-establish connection to the network, when uplink synchronization is lost, or in any other scenario where the UE 115 may synchronize with the base station 105. UE 115-*a* may transmit the RACH message based on a configuration conveyed by base station 105-*a* (e.g., in a configuration message 215).

In one embodiment, UE 115-*a* may perform a RACH procedure during a handover process. The handover process may be an example of a general handover procedure. In some cases, base station 105-*a* may correspond to a serving or source cell, as well as a neighbor or target cell. In other cases, base station 105-*a* may correspond to the serving cell, while another base station 105 (not pictured) may correspond to the target cell. In these cases, base station 105-*a* may still transmit the configuration message 215 to UE 115-*a*, but UE 115-*a* may transmit the RACH message 220 to the other base station 105 based on the configuration message 215. UE 115-*a* may detect a neighbor cell based on receiving a synchronization signal (SS) associated with the neighbor cell. For example, the UE 115-*a* may detect a neighbor cell through the neighbor cell's SS block(s). UE 115-*a* may track both the serving cell and the neighbor cell by receiving SSs (e.g., primary synchronization signals (PSS)s or secondary synchronization signals (SSS)s) or CSI-RSs from both the serving cell and neighbor cell. UE 115-*a* may determine and compare channel qualities, interference levels, or cell qualities associated with both cells based on the received signals. In some cases, UE 115-*a* may report the cell or channel qualities to base station 105-*a* and the serving cell in an uplink transmission 210. In certain embodiments, UE 115-*a* may track and report cell qualities for multiple neighbor cells. A cell quality report may include one or more beam quality measurements for a set of one or more different beams for serving and/or neighbor base stations and/or cells.

Base station 105-*a* or the wireless network may determine whether to handover UE 115-*a* to a neighbor cell based on the reported cell or channel qualities. If base station 105-*a* or the wireless network determines to perform a handover procedure (e.g., based on a cell quality of the source cell being below a certain threshold, a cell quality of the neighbor cell being above a certain threshold, a difference in cell quality between the neighbor cell and the source cell being above a certain threshold, etc.), the neighbor cell may indicate a RACH configuration to the serving cell to reduce the latency of the corresponding RACH procedure.

Base station 105-*a* may indicate this RACH configuration for the neighbor cell to UE 115-*a*. For example, base station 105-*a* may indicate the RACH configuration in a configuration message 215, which may include or be an example of a handover command message. In the handover command message, base station 105-*a* may indicate an association between RACH resources and UE-specific CSI-RS configurations, an association between RACH resources and SS blocks, a set of dedicated RACH resources (e.g., by indicating time resources, frequency resources, a sequence, or some combination of these), or any other parameters relevant for RACH message 220 generation or transmission. In some examples, the CSI-RS configuration may be UE-specific.

The configuration message 215 may allocate dedicated RACH resources for UE 115-*a* to perform CFRA. These CFRA resources may be separate from common CBRA resources in time, frequency, or both. Transmitting RACH messages 220 in dedicated time domain CFRA resources may support different configurations than transmitting RACH messages 220 in common CBRA resources.

In some cases, the transmission parameter or parameters indicated by base station 105-*a* (e.g., in the configuration message 215) may depend on the resource region or the type of RACH procedure performed. For example, dedicated time and frequency resources in a dedicated time and frequency domain RACH regions may be used for CFRA (e.g., in handover procedures), but may not be used for CBRA (e.g., in initial access or handover procedures). Accordingly, the probability of interference in dedicated time and frequency resources may be lower than in common time and frequency resources, as RACH procedures in these dedicated resources are contention free and not used for initial access. To efficiently utilize these dedicated RACH time and frequency resources, the transmission parameters for RACH messages transmitted in these dedicated resources may be different from transmission parameters for common resources. For example, with less chance of interference, UE 115-*a* may transmit a RACH message 220 in dedicated resources using a greater transmit power, a shorter backoff period, a greater maximum number of preamble retransmissions, or the like, or any combination thereof, as compared to one or more RACH transmission parameters for common resources.

Base station 105-a may transmit a RACH transmission parameter (e.g., an indication of a value for a RACH transmission parameter) to UE 115-a. The RACH transmission parameter for CFRA procedures may be different than for CBRA procedures. Additionally or alternatively, the transmission parameter for CFRA procedures corresponding to a dedicated RACH preamble in a dedicated time and frequency resource may be different than a transmission parameter for CFRA procedures corresponding to a dedicated RACH preamble in a common time and frequency resource. In some cases, transmission parameters may be based on an associated SSB or CSI-RS. For example, it may depend on the resources corresponding to the dedicated RACH preamble associated with the SSB or CSI-RS. The UE 115-a may implement a first transmission parameter for a CFRA procedure if the resources for the SSB or CSI-RS are dedicated time and frequency resources and may implement a second transmission parameter for a CFRA procedure if the resources are common time and frequency resources. In each of the above cases, base station 105-a or UE 115-a may select transmission parameters for CFRA or dedicated resources based on the lower probability of interference when using this procedure or these resources.

Base station 105-a may signal the RACH preamble parameters in a handover message. In some cases, the configuration message 215 may indicate a subset of RACH preambles for performing a CFRA procedure. UE 115-a may select a RACH preamble for the RACH message 220 from the subset of RACH preambles in order to perform a CFRA procedure. Alternatively or additionally, UE 115-a may select a RACH preamble for the RACH message 220 from a subset of RACH preambles disjoint from the indicated subset of RACH preambles in order to perform a CBRA procedure. For example, in one specific case, 16 RACH preambles of a set of 64 RACH preambles may be utilized for CFRA procedures—and, correspondingly, may indicate that the current RACH procedure is a CFRA procedure—while the remaining 48 RACH preambles may correspond to CBRA procedures.

In some cases, RACH resources for CBRA (e.g., time resources, frequency resources, etc.) may be defined by a physical random access channel (PRACH)-ConfigurationIndex. The PRACH-ConfigurationIndex may indicate a time occasion for PRACH. Base station 105-a or UE 115-a may use these resources for initial access or handover. Additionally, RACH resources for CFRA may be defined by a PRACH-ConfigurationIndexDedicated, which may be utilized for handover of UEs 115 implementing CFRA. In some cases, specific other RRC processes may utilize these dedicated RACH resources. In some examples, both CBRA and CFRA may utilize a PRACH-ConfigurationIndex.

The transmission parameter sent from base station 105-a to UE 115-a may indicate one or more parameters, configurations, or values for UE 115-a to utilize when transmitting the RACH message 220. The RACH transmission parameter may indicate the PRACH-ConfigurationIndex or PRACH-ConfigurationIndexDedicated as described above. Additionally or alternatively, the RACH transmission parameter may indicate: a contention resolution timer; a root sequence or root sequence index, which may include a range of values; a zero correlation zone configuration; a RACH Msg1 sub-carrier spacing; a RACH Msg1 frequency division multiplexing (FDM) value, which may indicate a number of RACH transmission opportunities (e.g., occasions) that may be frequency division multiplexed in a single time instance; a frequency start value, which may correspond to the offset of the lowest RACH transmission occasion in the frequency domain (e.g., with respect to physical resource block (PRB) 0); a configuration of restricted sets; a RACH preamble received target power (e.g., the target power level at the network receiver side); a random access response search space; a random access response control resource set (CORESET); a random access response window (e.g., a number of TTIs, sTTIs, or slots for the window length); a maximum number of preamble retransmissions (e.g., before declaring failure for the RACH transmission); a power ramping step (e.g., for each RACH or PRACH retransmission); a subcarrier spacing for the RACH message; a reference signal received power (RSRP) threshold for selecting an SSB; an RSRP threshold for selecting a CSI-RS; or any combination of these parameters, or other parameters relevant to transmitting a RACH message 220. UE 115-a may transmit the RACH message 220 according to the indicated transmission parameter or parameters.

In the case of UE handover, the neighbor cell may identify one or more uplink reception beams associated with UE 115-a. For example, if base station 105-a corresponds to both the serving cell and the neighbor cell, base station 105-a may have previously selected uplink reception beams for communication with UE 115-a. Additionally or alternatively, base station 105-a may determine channel qualities for different uplink reception beams between base station 105-a and UE 115-a, and may select one or more uplink reception beams based on the channel qualities. In an example, UE 115-a may sweep through multiple uplink transmission beam and transmit multiple RACH messages 220 (e.g., transmit Msg1 multiple times) before the expiration of a random access response window, and the base station 105-a may determine channel qualities for different uplink reception beams based on the multiple transmitted RACH messages 220. Base station 105-a may indicate to UE 115-a in the configuration message 215 dedicated CFRA resources corresponding to the selected uplink reception beams. In some cases, UE 115-a may be configured to transmit multiple RACH messages 220 in the dedicated RACH resources within a single random access response window. UE 115-a may transmit the same (or similar) RACH message 220 using multiple uplink transmission beams, and base station 105-a may receive the RACH messages 220 using the selected uplink reception beams.

However, base station 105-a may indicate additional configurations and information through dedicated time and/or frequency domain CFRA. In a first aspect, base station 105-a may indicate a transmission power for UE 115-a. For a UE 115 transmitting a RACH message 220 in common CBRA resources, the UE 115 may have to scale the transmission power to share the common RACH resources. That is, a base station 105 may receive RACH messages 220 from different UEs 115 in the common RACH resources. To keep received power at the base station 105 similar (e.g., equal, or within a certain threshold variation), each UE 115 transmitting a RACH message 220 in the CBRA resources may scale the transmission power, for example, based on its location in the cell. A UE 115 near the center of the cell may be required to transmit with a much lower power than a UE 115 near the cell edge in order for RACH messages 220 from the two UEs 115 to be received at the base station 105 at a similar power level. This scaling of transmission power may manage or limit interference across RACH message 220 transmissions for different UEs 115.

UE 115-*a* transmitting in dedicated CFRA resources may not need to follow such restrictions. The assigned dedicated RACH resources may be reserved for UE 115-*a*, and other UEs 115 may not transmit in these resources. That is, base station 105-*a* may schedule up to an entire set of RACH resources (e.g., including up to all preamble indices of a set of preamble indices) for UE 115-*a*, for example, based on a RACH load in the wireless network. For example, if the RACH load in the network is below a certain threshold, base station 105-*a* may configure UE 115-*a* to transmit a RACH message 220 at a higher power, with more information, or both. Additionally or alternatively, the network may identify a link gain of UE 115-*a* with respect to the neighboring cell. For example, base station 105-*a* may determine the link gain based on prior reports from UE 115-*a*. Accordingly, UE 115-*a* may transmit RACH messages 220 in dedicated RACH resources using a higher transmission power or a greater number of bits than in common RACH resources. In some cases, configuring a higher transmission power may support a higher modulation scheme (e.g., if a payload is used for the RACH message 220), a higher number of waveforms, or both to convey more bits than may be conveyed in a RACH message 220 in common RACH resources. The transmission parameter in the configuration message 215 may, for example, indicate a transmission power the UE 115-*a* is to use for transmitting the RACH message 220. In some examples, a serving base station 105-*a*—or a neighbor base station that is a handover target—may derive a transmission power using one or more cell quality reports of a UE 115-*a*, and may select the transmission parameter corresponding to the derived transmission power. In an example, the transmission parameter in the configuration message 215 may, for example, indicate a modulation scheme of a set of different modulation schemes that the UE 115-*s* is to use for transmitting the RACH message 220. In an example, the transmission parameter in the configuration message 215 may, for example, indicate a number of waveforms the UE 115-*a* is to use in an uplink beam for transmitting the RACH message 220. In an example, the transmission parameter in the configuration message 215 may, for example, indicate a number of bits the UE 115-*a* is to use in the RACH message 220, and the base station 105-*a* may determine the number of bits based on a link gain of the UE 115-*a*. In some examples, the transmission parameter in the configuration message 215 may indicate an assigned tone spacing for transmission of the RACH message 220 within the dedicated time and frequency resource, and the UE 115-*a* may transmit the RACH message 220 using the assigned tone spacing. In some examples, the assigned tone spacing may be different from an assigned tone spacing for transmission of a RACH message within a common time and frequency resource.

Base station 105-*a* may indicate this higher transmission power, higher modulation scheme, greater number of waveforms, greater number of bits, or some combination of these parameters to UE 115-*a* in an uplink transmission power control command, which may be transmitted as part of a handover message (e.g., a configuration message 215). In some cases, base station 105-*a* may determine different RACH loads for different uplink reception or transmission beams. In some examples, base station 105-*a* may determine a load parameter for a set of different uplink beams that the UE 115-*a* may use for transmission, and the transmission parameter in the configuration message 215 may indicate a transmission power for transmitting the RACH message 220 using an uplink beam based on the load parameter. The load parameter may be, for example, a power headroom measurement. In some cases, base station 105-*a* may indicate beam-specific uplink transmission power control to UE 115-*a*. UE 115-*a* may correspondingly transmit RACH messages 220 using different transmission powers depending on the uplink beams used.

In a second aspect, base station 105-*a* may configure UE 115-*a* to transmit one or more additional indexes in a RACH message 220 (e.g., RACH Msg1). If a UE 115 transmits a RACH message 220 in common RACH resources, the RACH message 220 may support 64 preamble sequences for each cell, for example, due to transmission power scaling as discussed above. In some cases, the system may not allow more preamble sequences in order to support cell-edge UEs 115. However, UE 115-*a* transmitting a RACH message 220 in dedicated RACH resources may transmit with a higher transmission power (e.g., UE 115-*a* may transmit at full power or up to full power). Transmitting at this higher power may allow UE 115-*a* to transmit additional information in the RACH message 220. Conveying additional information in a message may reduce the number of transmissions needed for a procedure, which may reduce both overhead and latency.

In some cases, UE 115-*a* may convey one or more additional SSB indexes, CSI-RS block indexes, beam indexes, or some combination of these indexes through a RACH message 220. In some cases, selecting one or more of these indexes may reduce RACH procedure latency or maintain maximum permissible exposure (MPE) regulations. For example, the content of the configuration message 215 may configure UE 115-*a* with how many and/or what type(s) of indexes to include in the RACH message 220. In some cases, base station 105-*a* or UE 115-*a* may select different beam indexes for downlink transmissions 205 and uplink transmissions 210. For example, UE 115-*a* may not be able to transmit in certain directions due to a directional transmission power restriction (e.g., due to MPE regulations).

To enable the UE 115-*a* to select at least one index, base station 105-*a* may allocate a RACH resource (e.g., Msg1 resource) in N symbols. In each symbol, base station 105-*a* may sweep a different uplink beam which may be the same as one or more downlink beams that base station 105-*a* uses to transmit an SS. Within each symbol, there could be a defined number of preambles (e.g., $2^6=64$ preambles). Base station 105-*a* or some other network entity may allocate up to all of the defined number of preambles (e.g., up to all 64 preambles) to UE 115-*a* in a dedicated time/frequency domain RACH region. For example, base station 105-*a* may allocate dedicated resources (e.g., in the time domain, frequency domain, or both) for a PRACH transmission for CFRA to a select set of UEs 115 to reduce latency for those UEs 115. In this way, a small number (e.g., less than 64) of UEs 115 may be allocated dedicated time or frequency resources for PRACH transmissions at a time. Base station 105-*a* may accordingly configure UE 115-*a* with multiple preambles in order to obtain additional information through the RACH message 220, as long as the total number of configured preambles is less than or equal to the total number of supported preambles (e.g., 64). For example, UE 115-*a* may transmit an indication of the link gain for the UE 115-*a* (e.g., as additional information in an additional preamble). In this way, base station 105-*a* may not have to assume that UE 115-*a* is at the cell edge, and can better identify a location of UE 115-*a* with respect to base station 105-*a*. Base station 105-*a* may then configure UE 115-*a* for a transmit power based on the link gain, which may allow UE 115-*a* to transmit additional information in later messages to base station 105-*a* based on the transmit power.

Additionally or alternatively, UE 115-*a* may select a suitable downlink beam and find the corresponding RACH resource. In some examples, UE 115-*a* may select the preamble corresponding to the strongest downlink transmit beam of the base station 105-*a* (e.g., to convey the strongest downlink transmit beam to base station 105-*a*). In some examples, UE 115-*a* may not be able to transmit through the resource corresponding to the strongest downlink beam due to MPE restrictions.

In some aspects, UE 115-*a* may select PRACH resources based on SSBs received from base station 105-*a*. For example, UE 115-*a* may select the SSB with the highest RSRP at UE 115-*a* (e.g., select the best SSB during Msg1 transmission). In some cases, UE 115-*a* may indicate the selected SSB to base station 105-*a* in the RACH message 220 (e.g., if base station 105-*a* configured UE 115-*a* to indicate this information). Base station 105-*a* may determine a set of directions to transmit CSI-RS to UE 115-*a* based on the selected SSB. Based on the selection of the SSB, UE 115-*a* may reduce RACH latency, maintain MPE regulations, or both. In some cases, it may be advantageous for UE 115-*a* to select the SSB during RACH resource selection. Similarly, in some cases, base station 105-*a* may benefit from receiving SSB index information during a RACH procedure (e.g., a strongest SSB index in a RACH message 220). For example, base station 105-*a* may select a set of directions for transmission of CRS based on the SSB index information. Additionally or alternatively, base station 105-*a* may implement multi-beam downlink control in downlink RACH procedure transmissions (e.g., for RACH Msg2 in CFRA scenarios or RACH Msg4 in CBRA scenarios). Multi-beam downlink control may increase the robustness of the communications.

For CFRA, UE 115-*a* may transmit the additional information in RACH Msg1 through dedicated time or frequency region resources. UE 115-*a* may transmit information in addition to a first selected SSB index that satisfies a threshold (e.g., an RSRP threshold). For example, the additional information may include additional selected SSB indexes, link gains or layer 1 (L1) RSRP for a selected SSB index, or any other parameters relevant to a RACH procedure. UE 115-*a* may report this additional information during CFRA using dedicated preambles in dedicated time or frequency resources, or in common time or frequency RACH resources. For CBRA, UE 115-*a* may transmit selected SSB index information (e.g., a strongest SSB index) and/or the additional information in a RACH Msg3 transmission.

Base station 105-*a* may determine an uplink reception beam based on the RACH message 220 (e.g., based on a signal quality of the received RACH message 220). Additionally, for RACH messages 220 transmitted in dedicated RACH resources, base station 105-*a* may configure UE 115-*a* to include an indication of one or more selected downlink transmission beams in the RACH messages 220. UE 115-*a* may select the downlink transmission beams based on a ranking of reference signal power measurements of signals received from base station 105-*a* (e.g., by ranking the beams based on RSRP measurements), and may include one or more indexes corresponding to the selected beam(s) in the RACH message 220. UE 115-*a* may select the one or more indexes based on other measurements, including, for example, measured channel quality measurements, interference measurements, signal strength measurements, or the like, of prior downlink directional transmissions received from base station 105-*a*. Additionally or alternatively, UE 115-*a* may indicate one or more downlink transmission beams to base station 105-*a* by selecting a specific preamble. For example, the network may allocate a set of preambles (e.g., 64 preambles) for UE 115-*a* in dedicated time and frequency domain RACH resources, and UE 115-*a* may select one preamble of the set of preambles based on the selected downlink transmission beam(s). UE 115-*a* may modify the RACH message 220 to include the selected preamble. Based on the one or more indexes corresponding of the selected beam(s) or the preamble included in the RACH message 220, base station 105-*a* may select one or more beams for uplink transmissions 210 and downlink transmissions 205 based on as few as a single RACH message 220. Base station 105-*a* may transmit a random access response using one or more of the selected downlink directional transmissions, or may choose a different downlink directional transmission that does not correspond to any of the indexes included in the RACH message 220. The base station 105-*a* and the UE 115-*a* may use information included in the random access response to establish a connection. The random access response may, for example, assign a radio network temporary identifier (RNTI) to UE 115-*a*, include timing information, include a grant assigning uplink and/or downlink resources to the UE 115-*a*, or the like, or any combination thereof.

In some cases, configuring a UE 115 to indicate a downlink transmission beam in a common RACH resource message may be too costly (e.g., require too many bits or too much transmission power) for a base station 105. Additionally or alternatively, base station 105-*a* may configure UE 115-*a* to transmit other additional information in the RACH message 220 on directional downlink transmissions, for example, based on the configuration message 215. UE 115-*a* may be configured to report RSRP, such as L1 RSRP, of one or more beams in the RACH message 220.

In a third aspect, base station 105-*a* may indicate different RACH formats to UE 115-*a* (e.g., in the configuration message 215). The different RACH formats may correspond to different sequences for transmitting a RACH message 220. In some cases, a regular RACH sequence may be an example of a waveform, such as a Zadoff-Chu sequence. A RACH message 220 transmitted in common CBRA resources may implement the regular RACH sequence, so that multiple UEs 115 may transmit RACH messages in the same time and frequency resource.

UE 115-*a* may transmit the RACH message 220 in dedicated time and frequency domain CFRA resources reserved for UE 115-*a* (e.g., resources that may be partially or completely reserved for the UE 115-*a*). In some cases, UE 115-*a* may not need to transmit using a specific sequence to match other UEs 115. Instead, base station 105-*a* may configure UE 115-*a* to transmit using a specific sequence that may be different from or the same as the regular RACH sequence. For example, the content of the configuration message 215 may configure UE 115-*a* to transmit the RACH message 220 as a reference signal and a payload (e.g., similar to a physical uplink control channel (PUCCH) signal). The content of the configuration message 215 may configure UE 115-*a* to time-division or frequency-division multiplex the reference signal and payload for transmission. In some cases, implementing a reference signal and payload may allow for UE 115-*a* to convey more bits of information in the RACH message 220, reducing latency for the RACH procedure. In some examples, the content in the configuration message 215 may indicate a reference signal type of a set of different reference signal types for UE 115-*a* to include in the RACH message 220. Examples of reference signal types include a Zadoff-Chu sequence, a maximum length sequence (e.g., an m-sequence), a pseudo-random binary sequence (e.g., a gold sequence), or a quadrature phase shift keying (QPSK) sequence, or the like. Based on the configuration message 215, UE 115-*a* may be configured to transmit the RACH message 220 having the indicated reference signal type. Base station 105-*a* may configure the sequence for UE 115-*a* by transmitting an indication of the RACH format or the sequence in a UE-specific handover message (e.g., the configuration message 215).

In certain embodiments, UE 115-*a* may transmit the RACH message 220 for a random access procedure at a specific transmission time or in a specific TTI in order to convey one or more beam indexes. For example, UE 115-*a* and base station 105-*a* may determine the beam indexes based on the transmission time implicitly using a selected rule (e.g., a first time interval corresponds to a first beam, a second time interval corresponds to a second beam, etc.). In some examples, the RACH message 220 may specify at least one beam index that may differ from a beam index corresponding to a specific transmission time. Base station 105-*a* may determine the specific TTI out of multiple different TTIs in which UE 115-*a* transmitted the RACH message 220 and may determine the beam index corresponding to that specific TTI. Base station 105-*a* may select a downlink beam for transmission of a random access response message based on an indication of a beam index received in the RACH message 220 and/or based on the determined beam index corresponding to the specific TTI. In an example, the selected rule may be that the base station 105-*a* selects the beam index conveyed through the selected preamble to utilize as a downlink transmission beam during Msg2 of a random access response and prioritizes this beam index over a beam index reported through transmitting in a specific transmission time, or vice versa. In some cases, UE 115-*a* may receive the random access response message from base station 105-*a* via one or more downlink transmission beams that correspond to one or more of the conveyed beam indexes.

In some cases, base station 105-*a* may determine an interleaving pattern for a random access response window based on one or more beam indexes or one or more TTIs in which the RACH message 220 is transmitted. For example, if RACH message 220 conveys indices of two base station transmission beams, the base station 105-*a* may split a random access response window into at least two interleaved parts. The base station 105-*a* may transmit Msg2 through the downlink transmission beam conveyed in the first beam index of the RACH message in the first part of the random access response window. In some examples, the base station 105-*a* may transmit Msg2 through the downlink transmission beam conveyed in the second beam index of the RACH message in the second part of the random access response window.

UE 115-*a* may monitor the random access response window for a random access response transmission from base station 105-*a* (e.g., in response to the RACH message 220). UE 115-*a* may monitor the random access response window based on an interleaving pattern. For example, UE 115-*a* may monitor a first portion of the random access response window using a first downlink reception beam, and may monitor a second portion of the random access response window using a second downlink reception beam different from the first. Base station 105-*a* may transmit the random access response message based on the interleaving pattern. For example, base station 105-*a* may transmit the random access response message in either the first portion or the second portion of the random access response window (e.g., using different downlink transmission beams) or may transmit the random access response message in both portions of the random access response window, for example, using a first beam for a first random access response message in the first portion and a second beam for a second random access response message in the second portion. In some cases, UE 115-*a* may receive an indication or configuration of the interleaving pattern from base station 105-*a*. For example, UE 115-*a* may determine the interleaving pattern based on a received master information block (MIB), system information block (SIB), remaining minimum system information (RMSI), handover message, or some combination of these signals or parameters.

In some cases, base station 105-*a* may configure UE 115-*a*—using a configuration message 215—to include a quality report in a RACH message 220. UE 115-*a* may generate the RACH message 220 to include the quality report, which may be an example of a beam quality report or a cell quality report. For a beam quality report, UE 115-*a* may include information about one or more downlink or uplink beams. For example, UE 115-*a* may include an RSRP, a reference signal received quality (RSRQ), a reference signal strength indicator (RSSI), a channel quality indicator (CQI), a signal-to-noise ratio (SNR), a signal to interference and noise ratio (SINR), or any combination of these values for any number of beams. In some cases, the beams may include SSs transmitted within an SSB, a CSI-RS, a mobility reference signal (MRS), or some combination of these signals. Theses SSs may include a PSS, an SSS, a physical broadcast channel (PBCH) signal, a demodulation reference signal (DMRS) of a PBCH signal, or any combination of these signals. Base station 105-*a* may select an uplink parameter based on the quality report, and may transmit an indication of the uplink parameter to UE 115-*a* (e.g., in a random access response message). For example, the uplink parameter may be an example of scheduling for an uplink message, a modulation or coding scheme for the uplink message, a power control parameter for an uplink message, or some similar parameter indicating a configuration for UE 115-*a* to transmit further uplink messages. UE 115-*a* may determine the uplink parameter, and may transmit one or more further uplink messages based on the uplink parameter.

The above aspects may correspond to a wireless communication system 200 where base station 105-*a* supports both the serving cell and the target cell in a handover process. However, all of these aspects may similarly apply to a case where base station 105-*a* supports a serving cell, and a second base station 105 supports the target cell for handover. In such a case, base station 105-*a* may determine to handover UE 115-*a* to the target base station 105. In some cases, base station 105-*a* may transmit an indication of this handover process to the target base station 105, and the target base station 105 may respond with an indication of content or transmission parameters (e.g., RACH transmission parameters) for UE 115-*a* to use for initiating a RACH procedure. Base station 105-*a* may transmit or forward this content, transmission parameters, or both to UE 115-*a* in a configuration message 215. In this way, base station 105-*a* may provide uplink transmit power control information to UE 115-*a*, as well as may assign dedicated time and frequency domain resources for UE 115-*a* to transmit a RACH message 220 for a CFRA process.

UE 115-*a* may generate and transmit the RACH message 220 to the target base station 105 based on the configuration message 215 from base station 105-*a*. In some cases, the RACH message 220 may support a beam management procedure involving measurement reporting of additional indices (e.g., indices related to one or more SSBs associated with the strongest signals of a set of signals). The target base station 105 may receive the RACH message 215 and may transmit a RACH response back to UE 115-*a* to continue the RACH handover process. In some cases, the target base station 105 may select to use uplink reception or downlink transmission beams based on indices received in the RACH message 220. In some cases, this may allow the target base station 105 to select beams corresponding to channels with a highest channel quality. The target base station 105 may use such a selected downlink transmission beam to send the RACH response.

Figure 3:
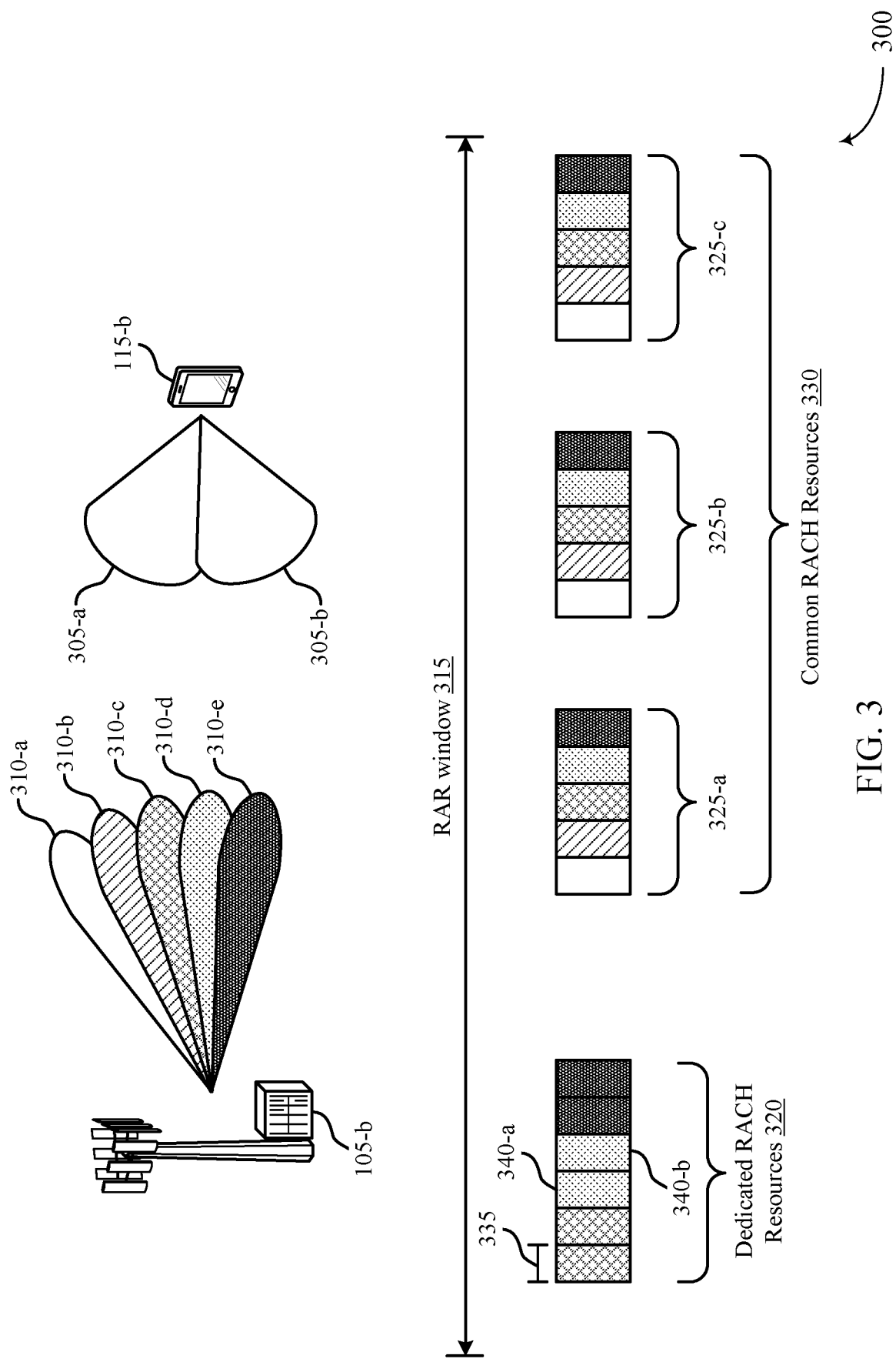
FIG. 3 illustrates an example of a random access channel (RACH) messaging configuration in accordance with aspects of the present disclosure.

FIG. 3 illustrates an example of a RACH messaging configuration 300 in accordance with various aspects of the present disclosure. The RACH messaging configuration 300 may include UE 115-*b* transmitting RACH messages on the uplink to base station 105-*b*. UE 115-*b* and base station 105-*b* may be examples of the corresponding devices as described with reference to FIGS. 1 and 2. As illustrated, UE 115-*b* may transmit the RACH messages using two uplink transmission beams 305 (e.g., uplink transmission beams 305-*a* and 305-*b*), and base station 105-*b* may receive the RACH messages using five uplink reception beams 310 (e.g., uplink reception beams 310-*a*, 310-*b*, 310-*c*, 310-*d*, and 310-*e*). However, UE 115-*b* and base station 105-*b* may operate using any number of transmission and reception beams. These uplink reception beams 310 may also support downlink transmissions from base station 105-*b*, such as synchronization signals or RACH response messages. UE 115-*b* may transmit multiple RACH messages during a random access response window 315.

For example, in the contention-free case, UE 115-*b* may transmit multiple RACH messages in dedicated RACH resources 320 (e.g., based on a configuration received from base station 105-*b*, if base station 105-*b*, UE 115-*b*, and the wireless network support multiple dedicated RACH transmissions). UE 115-*b* may transmit the multiple RACH messages in different transmission occasions in the time domain before the end of the random access response window 315. The time resources assigned as dedicated RACH resources 320 may be different from time resources assigned for CBRA (i.e., the common RACH resources 330). UE 115-*b* may transmit the multiple RACH messages using the same or different uplink transmission beams 305. Additionally or alternatively, UE 115-*b* may transmit a RACH message in common RACH resources 330 during the random access response window 315.

In the RACH messaging configuration 300, base station 105-*b* may allocate resources for UE 115-*b* to transmit RACH messages, such as RACH preamble messages (i.e., RACH Msg1). For example, base station 105-*b* may generate or allocate dedicated RACH resources 320, which may include one or more TTIs 335 (e.g., 1, 2, 3, 4, 6, or 12 symbols, one or more slots, one or more subframes, etc.) for each uplink reception beam 310. The dedicated RACH resources 320 may indicate RACH resources in the time domain, frequency domain, or preamble domain (e.g., a preamble sequence domain). In some cases, base station 105-*b* may configure UE 115-*b* to transmit a specific number of RACH messages in the dedicated RACH resources 320, and may include that specific number of TTIs 335 for each uplink reception beam 310. Additionally or alternatively, base station 105-*b* may allocate periodic or aperiodic sets of common RACH resources 325 in a pool of common RACH resources 330. The dedicated RACH resources 320 and common RACH resources 330 may be distinct in the time domain. In some cases, each set of common RACH resources 325 may include one TTI 335 per uplink reception beam 310. In contrast to including multiple TTIs 335 per uplink reception beam 310, this may reduce overhead for the common RACH resources 330 during a RACH procedure.

Base station 105-*b* may send a configuration message, such as a handover command message, to UE 115-*b* to configure RACH messages transmitted in the dedicated RACH resources 320. The configuration message may indicate a transmission power, additional information to include in the RACH message, a RACH format or sequence, or some combination of these or other RACH transmission parameters. Additionally or alternatively, the configuration message may specify uplink transmission and uplink reception beams to use for the RACH message transmissions. For example, base station 105-*b* may select uplink reception beams 310-*c*, 310-*d*, and 310-*e* for UE 115-*b*. In some cases, base station 105-*b* may select the uplink reception beams 310 based on previous transmissions, channel measurements, a direction from base station 105-*b* to UE 115-*b*, or beam rankings. Base station 105-*b* may also configure the uplink transmission beams 305 for UE 115-*b* to utilize. For example, UE 115-*b* may be configured to transmit a RACH message in resource 340-*a* using first uplink transmission beam 305-*a* and transmit in an additional RACH message in resource 340-*b* using second uplink transmission beam 305-*b*. Additionally or alternatively, UE 115-*b* may be configured to transmit using a same uplink transmission beam 305 (e.g., first uplink transmission beam 305-*a*) in both resources 340-*a* and 340-*b*. This redundant transmission may increase reliability of the RACH message transmission (e.g., in case of bursty interference in the channel).

Figure 4:
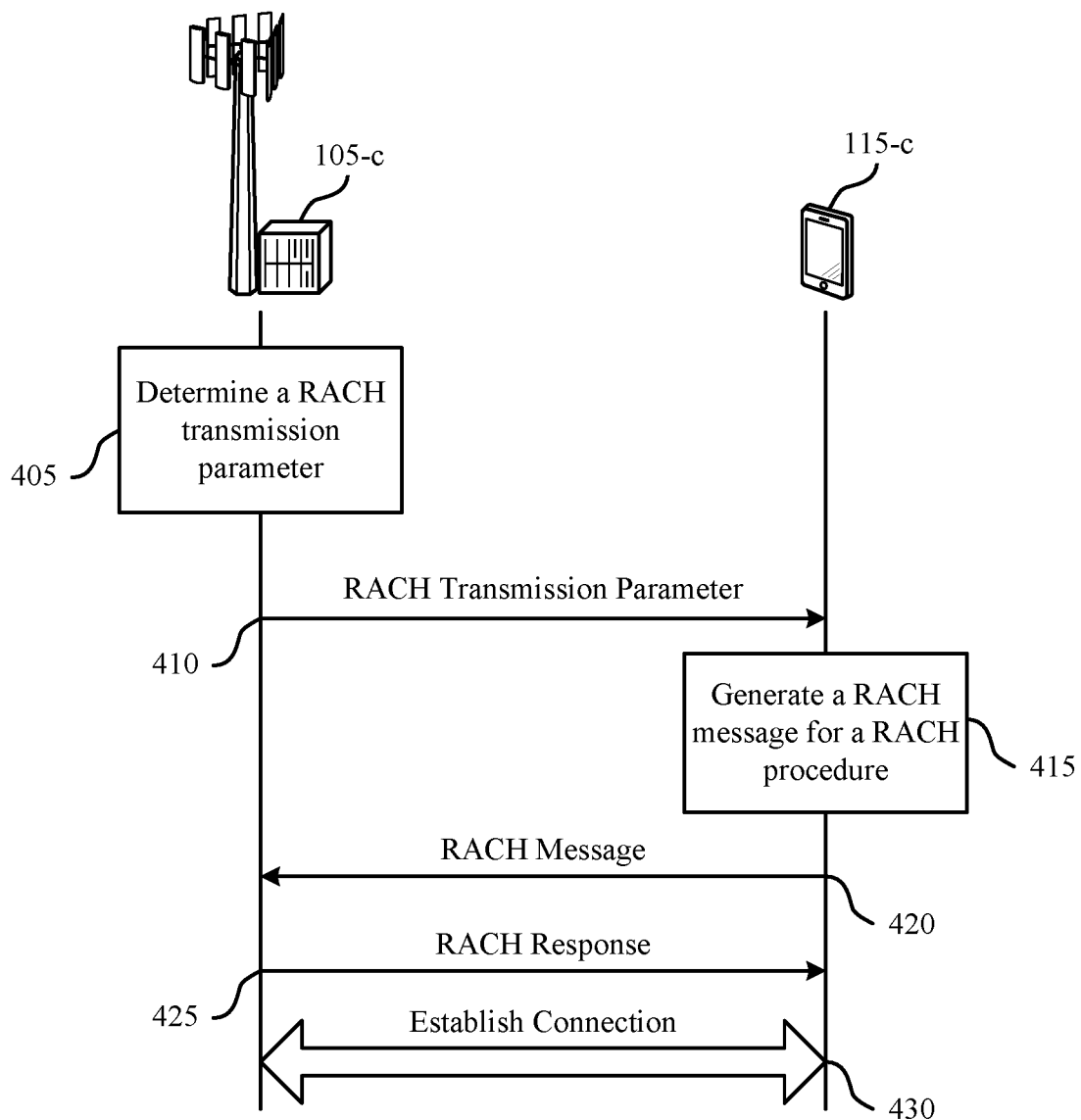
FIGS. 4 through 6 illustrate examples of process flows that support different configurations for message content and transmission in a random access procedure in accordance with aspects of the present disclosure.

FIG. 4 illustrates a process flow 400 that supports different configurations for message content and transmission in a random access procedure in accordance with various aspects of the present disclosure. The process flow 400 may include base station 105-*c* and UE 115-*c*, which may be examples of the corresponding devices as described with reference to FIGS. 1, 2, and 3. Base station 105-*c* may configure UE 115-*c* to generate UE-specific or beam-specific RACH messages (e.g., RACH preamble messages, RACH Msg1, etc.) during, for example, a handover process.

At 405, base station 105-*c* may determine a configuration for UE 115-*c* to perform a RACH procedure. Determining the configuration may involve determining a RACH transmission parameter. The transmission parameter may depend on the RACH region configured for the RACH procedure or the type of RACH procedure. For example, a transmission parameter for a CFRA procedure may be different from a transmission parameter for a CBRA procedure. Additionally or alternatively, a RACH transmission parameter corresponding to dedicated time and frequency resources may be different from a transmission parameter corresponding to common time and frequency resources. Furthermore, transmission parameters may be different for different SSBs, CSI-RSs, or both (e.g., depending on the resources or types of RACH procedures associated with the SSBs or CSI-RSs, or depending on the RACH preamble associated with the SSBs or CSI-RSs).

At 410, base station 105-*c* may transmit the RACH transmission parameter to UE 115-*c* (e.g., based on the determined configuration). For example, base station 105-*c* may transmit a configuration message (e.g., a handover message) with the transmission parameter to UE 115-*c*. In some cases, base station 105-*c* may configure UE 115-*c* with a CFRA resource.

At 415, UE 115-*c* may generate a RACH message for the RACH procedure (e.g., based on the received configuration message). For example, the content of the configuration message may instruct the UE 115-*c* to include at least one index in a payload of the RACH message, where the index is an example of an SSB index, a CSI-RS block index, a beam index, or some other relevant index. UE 115-*c* may select the index based on a ranking of reference signal received power measurements for a set of reference signals received from base station 105-*c* or based on a directional transmission power restriction. In some cases, the indicated content may specify a number of bits (e.g., based on the UE 115-*c* link gain) to include in the RACH message.

At 420, UE 115-*c* may transmit the RACH message in a random access procedure to base station 105-*c*. For example, UE 115-*c* may transmit the RACH message in a directional transmission within a dedicated time and frequency resource for a CFRA procedure. UE 115-*c* may transmit the RACH message using one or more uplink transmission beams based on the configured transmission parameter. For example, the transmission parameter may indicate a transmission power, a reference signal type, a modulation scheme, a number of waveforms, or some combination of these parameters for transmission. The transmission parameter may be different for CFRA procedures as opposed to CBRA procedures. In some cases, UE 115-*c* may perform time or frequency division multiplexing on a reference signal and payload of the RACH message, and may transmit the corresponding signal.

At 425, base station 105-*c* may transmit a random access response message back to UE 115-*c* in response to the RACH message. In some examples, base station 105-*c* may select a downlink directional transmission beam based on information in the RACH message (e.g., a beam index) and may transmit the random access response using the selected downlink directional transmission beam. At 430, UE 115-*c* may establish a connection with base station 105-*c* based on receiving the random access response message.

In some examples, so that a RACH transmission of one UE does not interfere with a RACH transmission of one or more other UEs, transmission power of a RACH transmission through common RACH resources and dedicated preamble indices within a common time/frequency RACH region may be scaled so that RACH transmissions of different UEs reach base station 105-*c* (e.g., a gNB) at a similar power level.

In a dedicated time domain RACH region, base station 105-*c* may schedule some, and up to a whole set, of RACH resources (e.g., some or all preamble indices) to one UE 115 if, for example, RACH load is lower in the network (e.g., RACH load is below a threshold). Hence, base station 105-*c* may allow UE 115-*c* to transmit CFRA in a dedicated time domain RACH region with higher transmit power and convey more information through a RACH message (e.g., a RACH Msg1).

In some examples, UE 115-*c* may select a suitable SS beam to transmit RACH Msg1 in both CBRA and CFRA to reduce RACH latency and to maintain MPE regulations. However, during CFRA through a dedicated time domain RACH region, UE 115-*c* may convey one or more additional SS/CSI-RS beam indices (e.g., a strongest downlink SS/CSI-RS beam index) to base station 105-*c*, and base station 105-*c* may use the indicated beam to transmit a RACH response (e.g., a RACH Msg2) to UE 115-*c*. In an example with reference to FIG. 4, beam reporting and management procedure during CFRA through a dedicated time/frequency domain RACH region of handover is described. At 410, base station 105-*c* may transmit a set of time and/or frequency resources and a preamble assignment to UE 115-*c* in, for example, a handover command that may or may not be part of a configuration message. At 415, the UE 115-*c* may select a suitable base station transmission beam (e.g., a strongest transmission beam) from a set of available transmission beams indicated in the handover command. The UE 115-*c* may select a preamble index of the preamble indices corresponding to the selected transmission beam (e.g., a RACH Msg1 preamble selected to convey the strongest gNB transmission beam). At 420, the UE 115-*c* may transmit a RACH message (e.g., a RACH Msg1) over a PRACH to the base station 105-*c*. The RACH message may include the selected preamble index and/or may include a beam report on one or more of the available transmission beams. The base station 105-*c* may process the RACH message and select a transmission beam for a RACH response (e.g., a random access response) based on the RACH message. For example, the base station 105-*c* may process the preamble index and/or beam report included in the RACH Msg1.

As described herein, during a CFRA procedure of handover through dedicated time/frequency domain RACH resources, a base station 105 in an NR system may consider providing uplink transmit power control information to a UE 115. Moreover, as described herein, during a CFRA procedure of handover through dedicated time/frequency domain RACH resources, a beam management procedure may involve measurement reporting of additional information (e.g., a strongest SSB) that allows a base station 105 (e.g., a gNB) and a UE 115 to select better beams.

Figure 5:
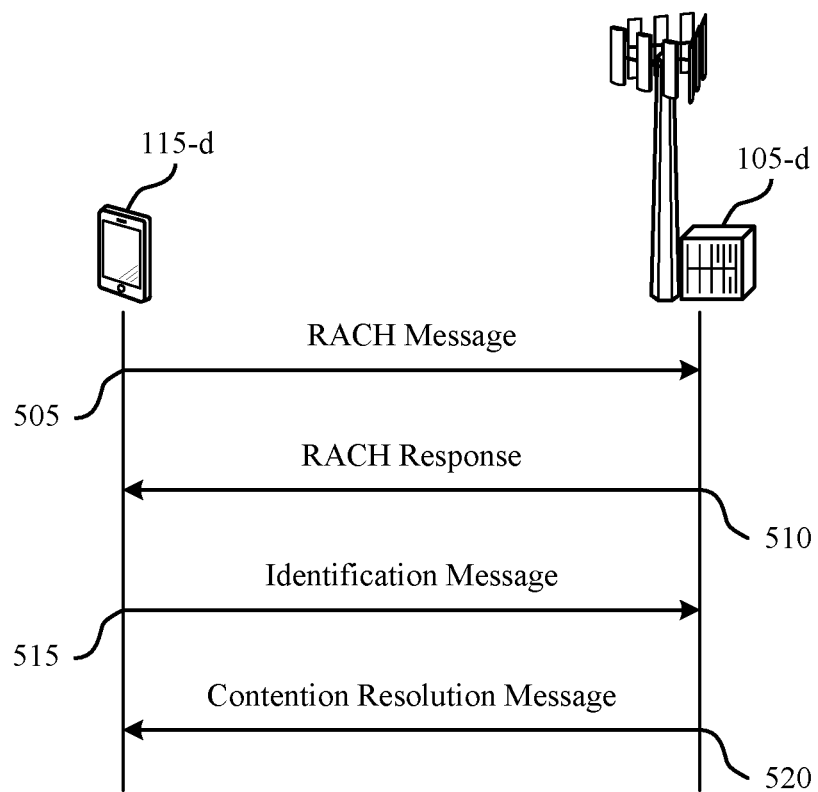

FIG. 5 illustrates a process flow 500 that supports different configurations for dedicated time/frequency domain RACH in accordance with various aspects of the present disclosure. The process flow 500 may include base station 105-*d* and UE 115-*d*, which may be examples of the corresponding devices as described with reference to FIGS. 1 through 4. The process flow 500 may illustrate a CBRA scenario where UE 115-*d* may transmit additional beam reporting information to base station 105-*d* in a RACH message 3 transmission.

At 505, UE 115-*d* may select an uplink transmission beam for a RACH message (e.g., a RACH preamble message, RACH Msg1, etc.). UE 115-*d* may transmit the RACH message on the selected uplink transmission beam to base station 105-*d* (e.g., transmit Msg1 on a PRACH). In some cases, the RACH message may include a beam report. In other cases, the RACH message may not include the beam report.

At 510, base station 105-*d* may select a downlink transmission beam for transmission to UE 115-*d*. Base station 105-*d* may transmit a RACH response message (e.g., a random access response message, referred to as a RACH Msg2) on the selected downlink transmission beam to UE 115-*d*.

At 515, UE 115-*d* may transmit a UE identification message (e.g., a RACH Msg3) to base station 105-*d*, which may optionally include a beam report. The beam report may be based on a received SS or SSB, and may include an indication of one or more beams for transmission and reception. For example, the beam report may include an indication of a downlink transmission beam for base station 105-*d* and a downlink reception beam for UE 115-*d*. In some cases, the UE identification message may not include a beam report.

At 520, base station 105-*d* may transmit a contention resolution message (e.g., a RACH Msg4) to UE 115-*d* to complete the RACH process. Base station 105-*d* may transmit the contention resolution message on a downlink transmission beam selected based on the beam report, and UE 115-*d* may receive the contention resolution message and utilize a downlink reception beam conveyed in the beam report for communication.

Figure 6:
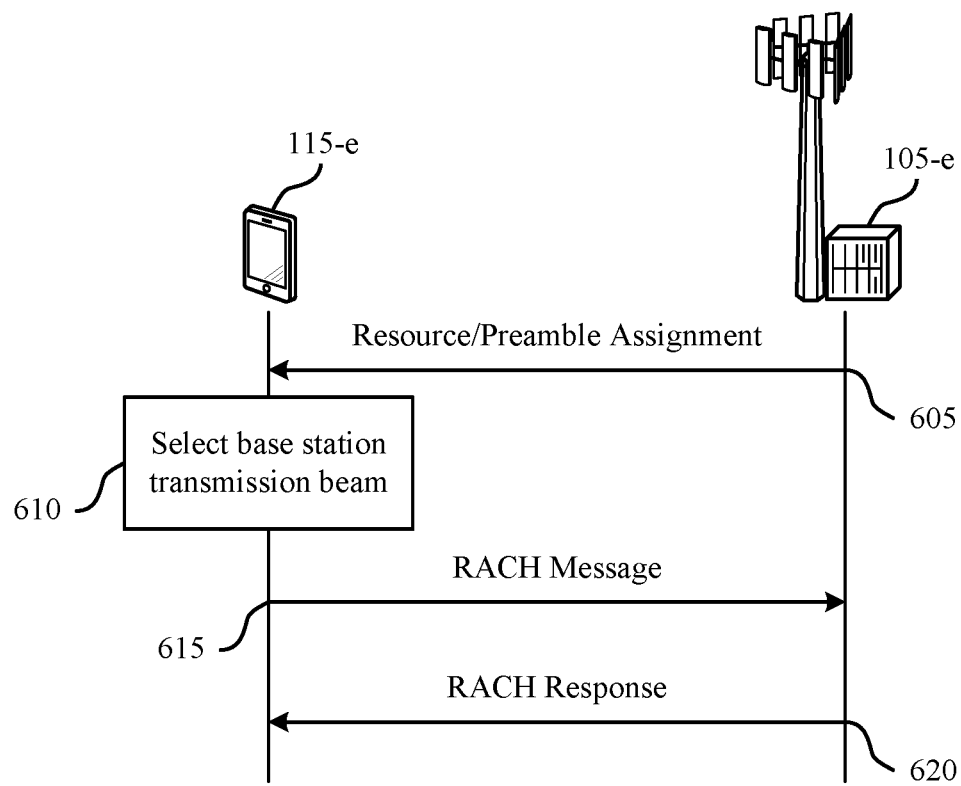

FIG. 6 illustrates a process flow 600 that supports different configurations for message content and transmission in a random access procedure in accordance with various aspects of the present disclosure. The process flow 600 may include base station 105-*e* and UE 115-*e*, which may be examples of the corresponding devices as described with reference to FIGS. 1 through 5. The process flow 600 may illustrate a CFRA scenario (e.g., during a handover procedure) where UE 115-*e* may transmit additional beam reporting information to base station 105-*e* in a RACH preamble message.

At 605, to grant UE 115-*e* contention-free resources, base station 105-*e* may transmit an indication of a set of time and frequency resources, a preamble assignment, or both to UE 115-*e*. This transmission may be based on or a component of a handover command for UE 115-*e*. The transmission may include an indication of a set of downlink transmission beams.

At 610, UE 115-*e* may select a downlink transmission beam for base station 105-*e*. The selection may be based on a set of candidate beams indicated in the handover command. UE 115-*e* may select a preamble for a RACH message (e.g., a RACH preamble message, RACH Msg1, etc.) in order to indicate the selected downlink transmission beam (e.g., a Msg1 preamble selected to convey the strongest transmission beam of base station 105-*e* from the set of beams).

At 615, UE 115-*e* may transmit the RACH message, indicating the selected downlink transmission beam, to base station 105-*e* using CFRA (e.g., transmitting RACH Msg1, PRACH, etc.). In some cases, UE 115-*e* may indicate the selected beam in a beam report.

At 620, base station 105-*e* may transmit a RACH response message (e.g., a RACH Msg2) to UE 115-*e* in response to the RACH message. Base station 105-*e* may transmit the RACH response message on the downlink transmission beam indicated in the RACH message (e.g., selecting the beam indicated in the beam report or a different beam). Following the RACH response message, in some cases UE 115-*e* and base station 105-*e* may exchange a UE identification message and a contention resolution message to complete the RACH procedure.

Figure 7:
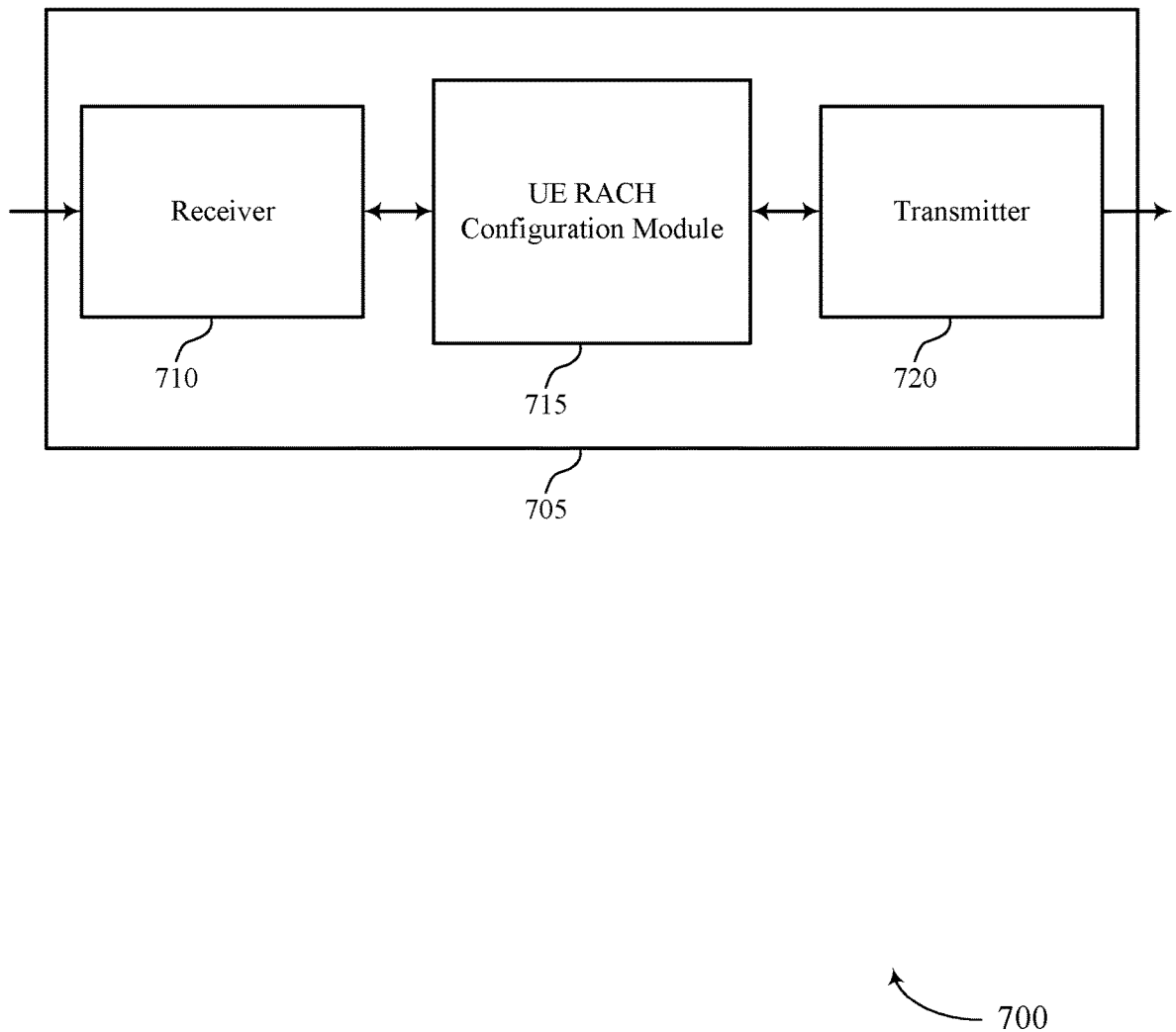
FIGS. 7 through 9 show block diagrams of a device in accordance with aspects of the present disclosure.

FIG. 7 shows a block diagram 700 of a wireless device 705 in accordance with aspects of the present disclosure. Wireless device 705 may be an example of aspects of a UE 115 as described herein. Wireless device 705 may include receiver 710, UE RACH configuration module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to different configurations for message content and transmission in a random access procedure, etc.). Information may be passed on to other components of the device. The receiver 710 may be an example of aspects of the transceiver 1035 described with reference to FIG. 10. The receiver 710 may utilize a single antenna or a set of antennas.

UE RACH configuration module 715 may be an example of aspects of the UE RACH configuration module 1015 described with reference to FIG. 10. UE RACH configuration module 715 and/or at least some of its various sub-components may be implemented in hardware, software executed by a processor, firmware, or any combination thereof. If implemented in software executed by a processor, the functions of the UE RACH configuration module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE RACH configuration module 715 and/or at least some of its various sub-components may be physically located at various positions, including being distributed such that portions of functions are implemented at different physical locations by one or more physical devices. In some examples, UE RACH configuration module 715 and/or at least some of its various sub-components may be a separate and distinct component in accordance with various aspects of the present disclosure. In other examples, UE RACH configuration module 715 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE RACH configuration module 715 may receive, from a base station, a first RACH transmission parameter for a CFRA procedure that differs from a second RACH transmission parameter for a CBRA procedure, generate a RACH message for the CFRA procedure, and transmit, based on the first RACH transmission parameter, the RACH message in the CFRA procedure.

In some cases, UE RACH configuration module 715 may receive, from a base station, a configuration message indicating content for a RACH message and a transmission parameter, generate the RACH message based on the indicated content, and transmit, based on the transmission parameter, the RACH message in a random access procedure.

Additionally or alternatively, UE RACH configuration module 715 may receive, from a base station, a configuration message for a RACH message and a first transmission parameter for a CFRA procedure, where the first transmission parameter corresponds to a dedicated RACH preamble within a dedicated time and frequency resource and differs from a second transmission parameter for a CFRA procedure corresponding to a dedicated RACH preamble within a common time and frequency resource. UE RACH configuration module 715 may generate the RACH message based on the configuration message, and transmit, based on the first transmission parameter, the RACH message in the CFRA procedure.

In some cases, UE RACH configuration module 715 may receive, from a base station, a configuration message for a RACH message and a first transmission parameter for a CFRA procedure, where the first transmission parameter corresponds to a dedicated RACH preamble associated with a first SSB or CSI-RS and differs from a second transmission parameter for a CFRA procedure corresponding to a dedicated RACH preamble associated with a second SSB or CSI-RS. The first SSB or CSI-RS may be associated with a dedicated time and frequency resource, and the second SSB or CSI-RS may be associated with a common time and frequency resource. UE RACH configuration module 715 may generate the RACH message based on the configuration message, and transmit, based on the first transmission parameter, the RACH message in the CFRA procedure.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
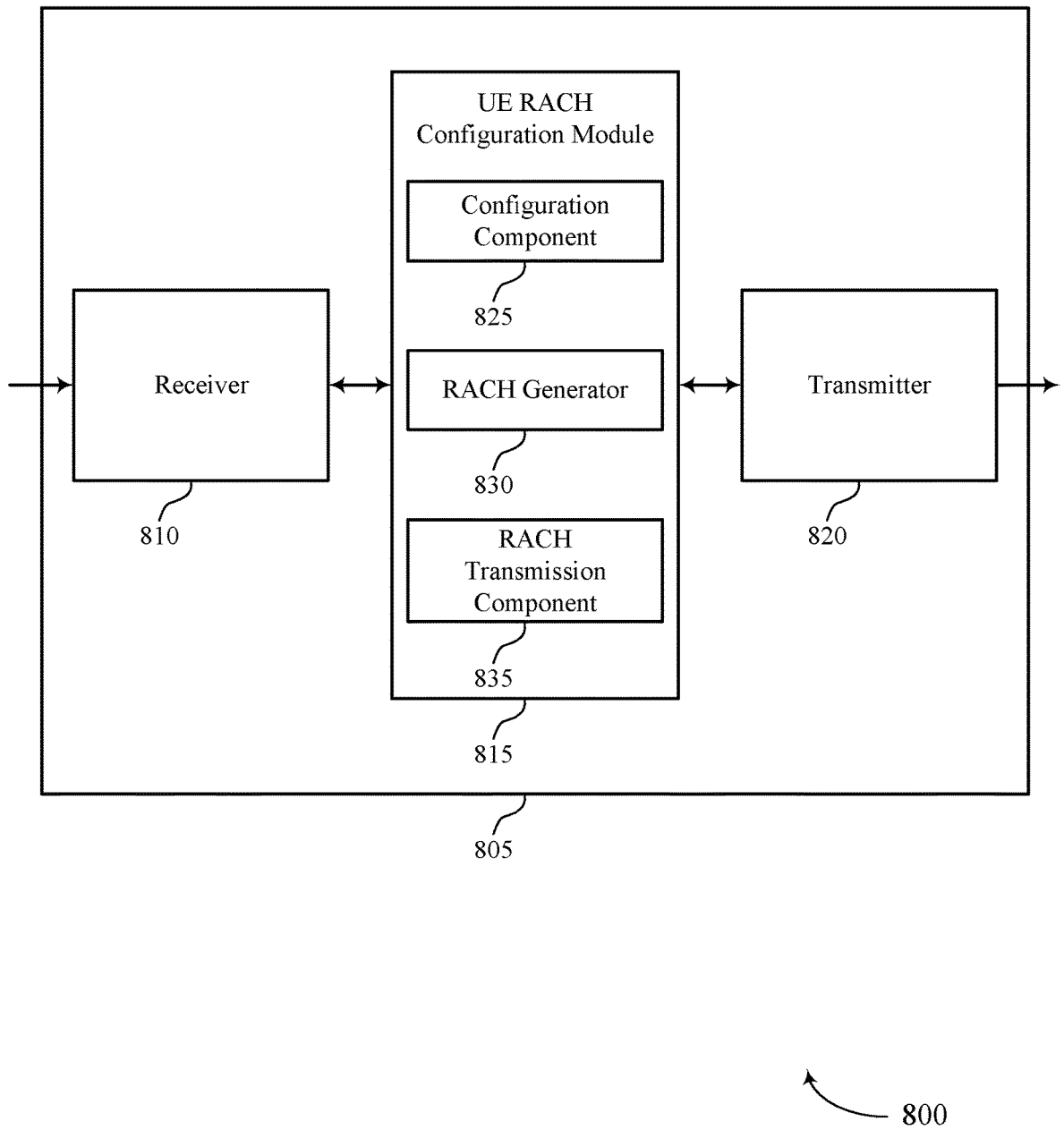

FIG. 8 shows a block diagram 800 of a wireless device 805 in accordance with aspects of the present disclosure. Wireless device 805 may be an example of aspects of a wireless device 705 or a UE 115 as described with reference to FIG. 7. Wireless device 805 may include receiver 810, UE RACH configuration module 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to different configurations for message content and transmission in a random access procedure, etc.). Information may be passed on to other components of the device. The receiver 810 may be an example of aspects of the transceiver 1035 described with reference to FIG. 10. The receiver 810 may utilize a single antenna or a set of antennas.

UE RACH configuration module 815 may be an example of aspects of the UE RACH configuration module 1015 described with reference to FIG. 10. UE RACH configuration module 815 may also include configuration component 825, RACH generator 830, and RACH transmission component 835.

In a first implementation, configuration component 825 may receive, from a base station, a first RACH transmission parameter for a CFRA procedure that differs from a second RACH transmission parameter for a CBRA procedure. RACH generator 830 may generate a RACH message for the CFRA procedure. RACH transmission component 835 may transmit, based on the first RACH transmission parameter, the RACH message in the CFRA procedure.

In a second implementation, configuration component 825 may receive, from a base station, a configuration message indicating content for a RACH message and a transmission parameter. In some cases, the configuration message is a handover message.

RACH generator 830 may generate the RACH message based on the indicated content. In some cases, the content indicates a number of bits in the RACH message, where generating the RACH message includes generating the RACH message based on the indicated number of bits. In some cases, the number of bits is based on a link gain of the UE.

RACH transmission component 835 may transmit, based on the transmission parameter, the RACH message in a random access procedure. In some cases, RACH transmission component 835 may transmit the RACH message in a CFRA procedure, within a dedicated time and frequency resource, in a directional transmission, or in any combination of these. In some cases, RACH transmission component 835 may transmit a time or frequency division multiplexed signal. In some cases, transmitting the RACH message includes transmitting the RACH message using a transmission power indicated by the transmission parameter. In some cases, the transmission parameter is generated by a target base station that differs from the base station. In some cases, transmitting the RACH message includes transmitting the RACH message in at least one additional directional transmission.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
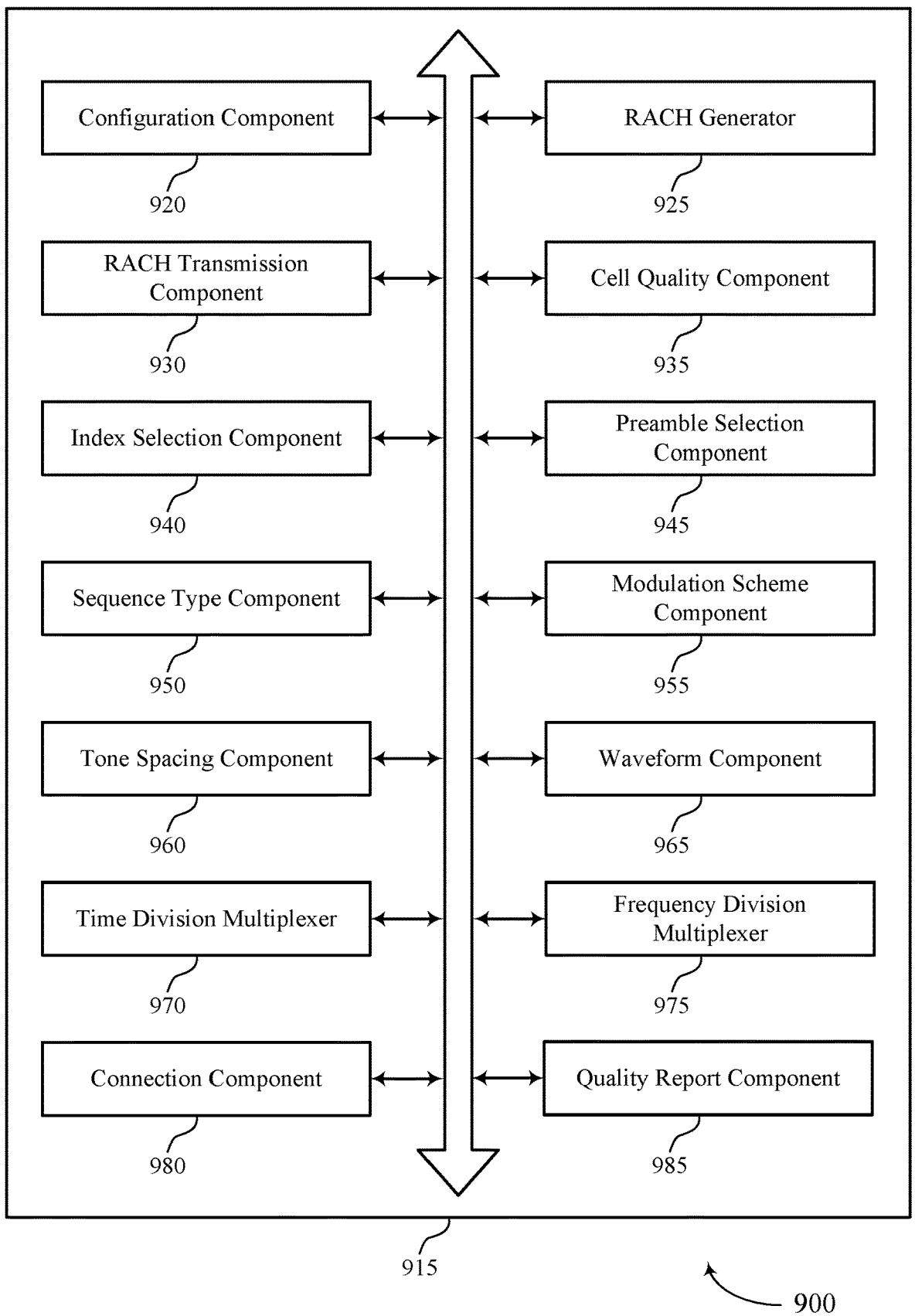

FIG. 9 shows a block diagram 900 of a UE RACH configuration module 915 in accordance with aspects of the present disclosure. The UE RACH configuration module 915 may be an example of aspects of a UE RACH configuration module 715, a UE RACH configuration module 815, or a UE RACH configuration module 1015 described with reference to FIGS. 7, 8, and 10. The UE RACH configuration module 915 may include configuration component 920, RACH generator 925, RACH transmission component 930, cell quality component 935, index selection component 940, preamble selection component 945, sequence type component 950, modulation scheme component 955, tone spacing component 960, waveform component 965, time division multiplexer 970, frequency division multiplexer 975, connection component 980, and quality report component 985. Each of these modules may communicate, directly or indirectly, with one another (e.g., via one or more buses).

Configuration component 920 may receive, from a base station, a first RACH transmission parameter for a CFRA procedure that differs from a second RACH transmission parameter for a CBRA procedure. In some cases, configuration component 920 may receive a configuration message indicating content for a RACH message and a transmission parameter. In some cases, the configuration message is a handover message. The RACH message may be an example of a RACH Msg1 or a RACH preamble.

The first RACH transmission parameter for the CFRA procedure may correspond to a dedicated RACH preamble within a dedicated time and frequency resource. The first RACH transmission parameter may differ from a third RACH transmission parameter for a CFRA procedure that corresponds to a dedicated RACH preamble within a common time and frequency resource. In some examples, the first RACH transmission parameter may correspond to a dedicated RACH preamble within a dedicated time and frequency resource that is associated with a first SSB, while the third RACH transmission parameter may correspond to a dedicated RACH preamble within a common time and frequency resource that is associated with a second SSB. In some examples, the first RACH transmission parameter may correspond to a dedicated RACH preamble within a dedicated time and frequency resource that is associated with a first CSI-RS, while the third RACH transmission parameter may correspond to a dedicated RACH preamble within a common time and frequency resource that is associated with a second CSI-RS.

In some cases, the first RACH transmission parameter may indicate a root sequence, or a random access response search space, or a random access response CORESET, or restricted set configurations, or a subcarrier spacing for the RACH message, or an RSRP threshold for selecting an SSB, or an RSRP threshold for selecting a CSI-RS, or any combination thereof. Furthermore, in some cases, the first RACH transmission parameter may indicate a PRACH configuration index, a number of RACH transmission opportunities available for frequency division multiplexing in a single time instance, a frequency offset of a lowest RACH transmission occasion, a zero correlation zone configuration, a RACH received target power, a maximum number of RACH preamble retransmissions, power ramping step for RACH preamble retransmissions, a random access response window length, or some combination thereof.

These transmission parameters may be different in order for a UE 115 or base station 105 to more efficiently utilize the RACH procedure and/or resources. The network (e.g., a base station 105) may control a RACH congestion level for a dedicated time and frequency RACH region, while the network may not be able to control, or may not have the same level of control over, the RACH congestion level for a common time and frequency RACH region. For example, in common time and frequency RACH resources, UEs 115 may utilize RACH preambles for CBRA that are not specifically scheduled by the network, and use of such RACH preambles may cause interference (e.g., RACH congestion) in the common time and frequency RACH resources. Accordingly, common time and frequency RACH regions may experience greater interference (e.g., from UEs 115 performing CBRA procedures) than dedicated time and frequency RACH regions, where UEs 115 may not perform these CBRA procedures. A base station 105 may send the different transmission parameters (e.g., preamble received target power, power ramping step, maximum preamble transmissions, etc.) to a UE 115 based on this difference in congestion levels between resources and/or procedures. For example, for a CFRA procedure and/or for dedicated RACH resources, the base station 105 may indicate for a UE 115 to utilize higher transmission powers, more frequent transmissions, or other transmission parameters for efficiently communicating in a lower interference environment (e.g., to improve throughput). In contrast, for a CBRA procedure and/or for common RACH resources, the base station 105 may indicate for the UE 115 to utilize lower transmission powers, less frequent transmissions, or other transmission parameters for efficiently communicating in a higher interference environment (e.g., to better share the resources by reducing the likelihood of interfering with other transmissions).

RACH generator 925 may generate a RACH message for the RACH procedure (e.g., a CFRA procedure). RACH generator 925 may generate the RACH message based on the indicated content. In some cases, the content indicates a number of bits in the RACH message, where generating the RACH message includes generating the RACH message based on the indicated number of bits. In some cases, the number of bits is based on a link gain of the UE. In some cases, RACH generator 925 may generate the RACH message based on the configuration message. Generating the RACH message based on the configuration message may include processing the configuration message to identify a first subset of a set of RACH preambles for the CFRA procedure, and selecting a RACH preamble for the RACH message from the first subset of the set of RACH preambles, where the first subset of the set of RACH preambles differs from a second subset of the set of RACH preambles for the CBRA procedure.

RACH transmission component 930 may transmit, based on the first RACH transmission parameter, the RACH message in the RACH procedure. In some cases, RACH transmission component 930 may transmit the RACH message in a CFRA procedure, within a dedicated time and frequency resource, in a directional transmission, or in any combination of these. In some cases, RACH transmission component 930 may transmit a time or frequency division multiplexed signal. In some cases, transmitting the RACH message includes transmitting the RACH message using a transmission power indicated by the transmission parameter. In some cases, the transmission parameter is generated by a target base station that differs from the base station. In some cases, transmitting the RACH message includes transmitting the RACH message in at least one additional directional transmission. In some cases, RACH transmission component 930 may transmit, based on the first transmission parameter, the RACH message in the CFRA procedure. For example, RACH transmission component 930 may transmit the RACH message within a dedicated time and frequency resource.

Cell quality component 935 may perform a set of processes associated with measured cell quality. For example, in some cases, the transmission power is derived based on one or more prior reports for the UE, the one or more prior reports indicating cell quality associated with a target base station. In some cases, the one or more prior reports include beam quality measurements for a set of different beams of the target base station, where the cell quality is based on the beam quality measurements.

Index selection component 940 may select at least one index from a set of indices, where the content includes an instruction to include the at least one index in a payload of the RACH message. In some cases, the at least one index may be an example of a beam index and may be selected from a set of base station beam indices. In these cases, index selection component 940 may transmit the RACH message at a transmission time to convey the at least one beam index or to implicitly identify a second beam index that differs from the at least one beam index, and index selection component 940 may receive a random access response via a downlink transmit beam that corresponds to the at least one beam index or the second beam index. In some cases, selecting the at least one index includes selecting the at least one index based on a ranking of RSRP measurements for a set of reference signals received from the base station. In some cases, the at least one index is one of an SSB index, a CSI-RS block index, or a beam index. In some cases, selecting the at least one index includes selecting the at least one index based on a directional transmission power restriction. Preamble selection component 945 may select, for the RACH message, a preamble from a set of preambles based on the selected at least one index.

Sequence type component 950 may identify that the content indicates a reference signal type of a set of different reference signal types, where transmitting the RACH message includes transmitting a reference signal having the indicated reference signal type. In some cases, the indicated reference signal type is one of a Zadoff-Chu sequence, or a maximum length sequence, or a pseudo-random binary sequence, or a quadrature phase shift keying sequence.

Modulation scheme component 955 may transmit the RACH message using an indicated modulation scheme. Tone spacing component 960 may transmit the RACH message using an assigned tone spacing for RACH message transmission within the dedicated time and frequency resource. In some cases, the assigned tone spacing is different from a second assigned tone spacing for RACH message transmission within a common time and frequency resource. Waveform component 965 may transmit the RACH message using the indicated number of waveforms.

Time division multiplexer 970 may generate a signal based on time division multiplexing a reference signal and a payload. Frequency division multiplexer 975 may generate a signal based on frequency division multiplexing a reference signal and a payload.

Connection component 980 may receive a random access response to the RACH message and establish a connection with the base station based on the random access response. In some cases, connection component 980 may monitor for the random access response in a random access response window based on an interleaving pattern. For example, connection component 980 may monitor for the random access response using a first receive beam in a first portion of the random access response window and a second receive beam in a second portion of the random access response window. In some cases, connection component 980 may process at least one of an MIB, an SIB, RMSI, a handover message, or some combination thereof, to identify the interleaving pattern of the random access response window.

Quality report component 985 may generate the RACH message to include a quality report, for example, when the content specifies to include a quality report in the RACH message. The quality report may be an example of a beam quality report or a cell quality report. In some cases, for a beam quality report, the report may include at least one of an RSRP, or an RSRQ, or an RSSI, or a CQI, or an SNR, or an SINR, or some combination of these, for one or more beams. In some cases, a beam of the one or more beams may include an SS transmitted within an SSB, or a CSI-RS, or an MRS. In some case, the SS may be an example of a PSS, or an SSS, or a PBCH signal, or a DMRS of a PBCH signal, or any combination thereof. In some cases, the quality report component 985 may process a random access response message that includes an uplink message parameter that corresponds to the quality report, and may transmit an uplink message based on the uplink message parameter. For example, the uplink message parameter may be an example of scheduling for the uplink message, a modulation or coding scheme for the uplink message, a power control parameter for the uplink message, or some combination thereof.

Figure 10:
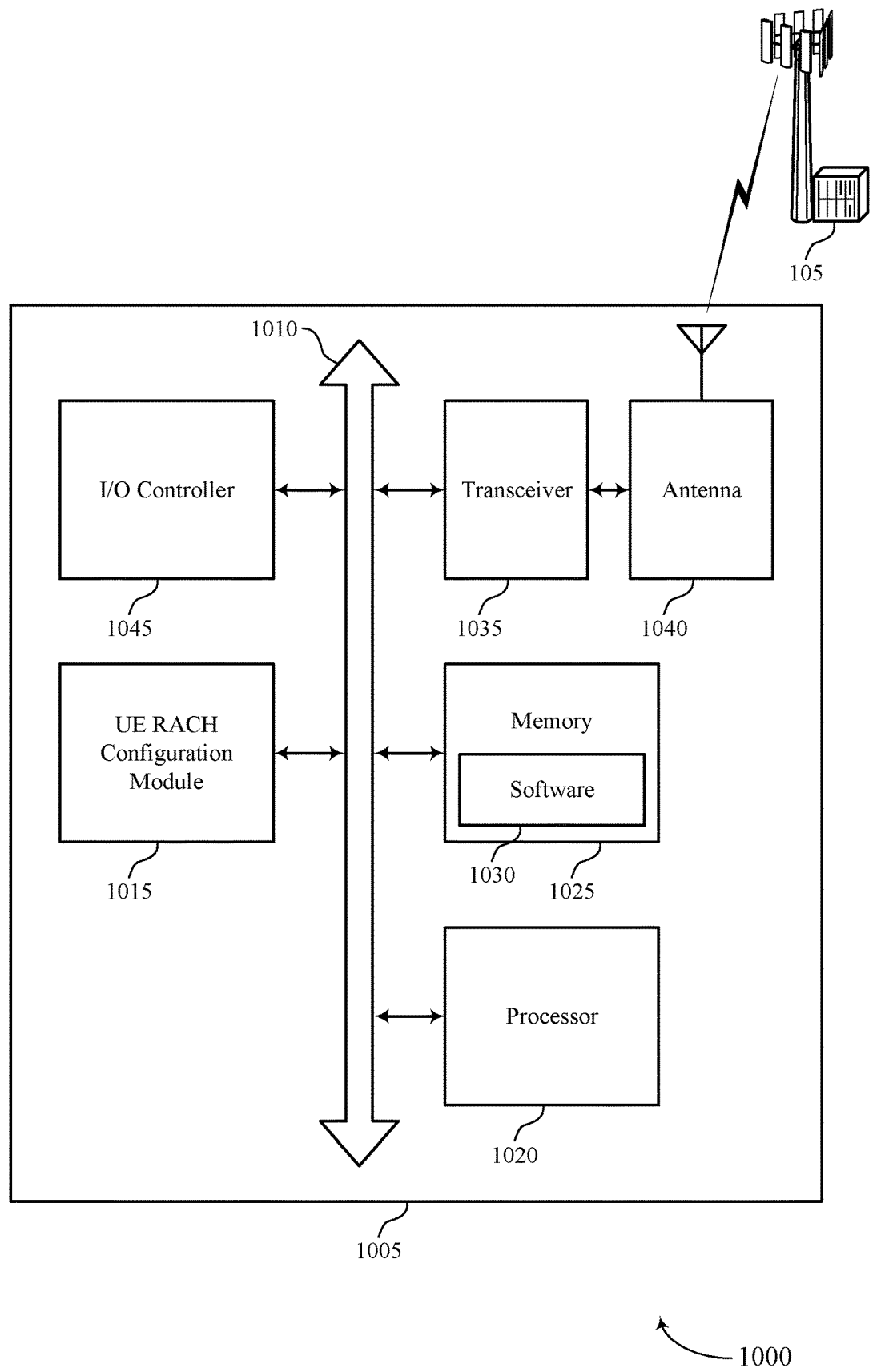
FIG. 10 illustrates a block diagram of a system including a user equipment (UE) in accordance with aspects of the present disclosure.

FIG. 10 shows a diagram of a system 1000 including a device 1005 in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE RACH configuration module 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting different configurations for message content and transmission in a random access procedure).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support different configurations for message content and transmission in a random access procedure. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
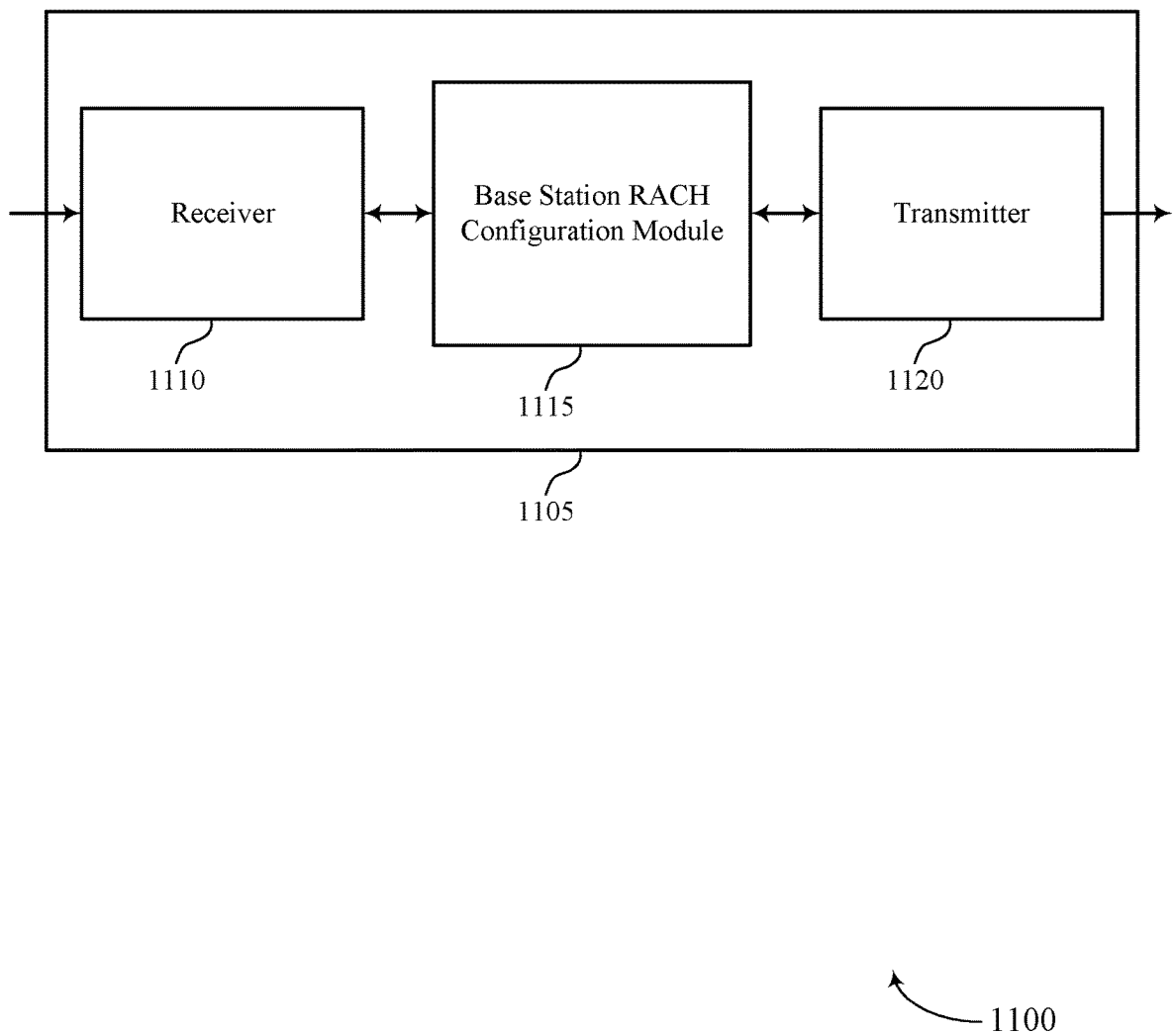
FIGS. 11 through 13 show block diagrams of a device in accordance with aspects of the present disclosure.

FIG. 11 shows a block diagram 1100 of a wireless device 1105 in accordance with aspects of the present disclosure. Wireless device 1105 may be an example of aspects of a base station 105 as described herein. Wireless device 1105 may include receiver 1110, base station RACH configuration module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to different configurations for message content and transmission in a random access procedure, etc.). Information may be passed on to other components of the device. The receiver 1110 may be an example of aspects of the transceiver 1435 described with reference to FIG. 14. The receiver 1110 may utilize a single antenna or a set of antennas.

Base station RACH configuration module 1115 may be an example of aspects of the base station RACH configuration module 1415 described with reference to FIG. 14. Base station RACH configuration module 1115 and/or at least some of its various sub-components may be implemented in hardware, software executed by a processor, firmware, or any combination thereof. If implemented in software executed by a processor, the functions of the base station RACH configuration module 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station RACH configuration module 1115 and/or at least some of its various sub-components may be physically located at various positions, including being distributed such that portions of functions are implemented at different physical locations by one or more physical devices. In some examples, base station RACH configuration module 1115 and/or at least some of its various sub-components may be a separate and distinct component in accordance with various aspects of the present disclosure. In other examples, base station RACH configuration module 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station RACH configuration module 1115 may transmit, to a UE, a first RACH transmission parameter for a CFRA procedure that differs from a second RACH transmission parameter for a CBRA procedure, receive, based on the first RACH transmission parameter, the RACH message in the CFRA procedure, and transmit a random access response based on the RACH message.

In some case, base station RACH configuration module 1115 may configure a UE with content for a RACH message and a transmission parameter. Additionally, base station RACH configuration module 1115 may receive, based on the transmission parameter, the RACH message in a random access procedure, and transmit a random access response based on the RACH message. Additionally or alternatively, base station RACH configuration module 1115 may determine to handover a UE from the base station to a target base station. The base station RACH configuration module 1115 may additionally receive, from the target base station, an indication of content for a RACH message and a transmission parameter, and transmit, to the UE, a configuration message indicating the content for the RACH message and the transmission parameter.

Additionally or alternatively, base station RACH configuration module 1115 may transmit, to a UE, a configuration message for a RACH message and a first transmission parameter for a CFRA procedure corresponding to a dedicated RACH preamble for a dedicated time and frequency resource, where the first transmission parameter differs from a second transmission parameter for a CFRA procedure corresponding to a dedicated RACH preamble for a common time and frequency resource. Base station RACH configuration module 1115 may receive, based on the first transmission parameter, the RACH message in the CFRA procedure, and transmit a random access response based on the RACH message.

In some cases, base station RACH configuration module 1115 may transmit, to a UE, a configuration message for a RACH message and a first transmission parameter for a CFRA procedure corresponding to a dedicated RACH preamble (e.g., within a dedicated time and frequency resource) that is associated with a first SSB or CSI-RS, where the first transmission parameter differs from a second transmission parameter for a CFRA procedure corresponding to a dedicated RACH preamble (e.g., within a common time and frequency resource) that is associated with a second SSB or CSI-RS. Base station RACH configuration module 1115 may receive, based on the first transmission parameter, the RACH message in the CFRA procedure, and transmit a random access response based on the RACH message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
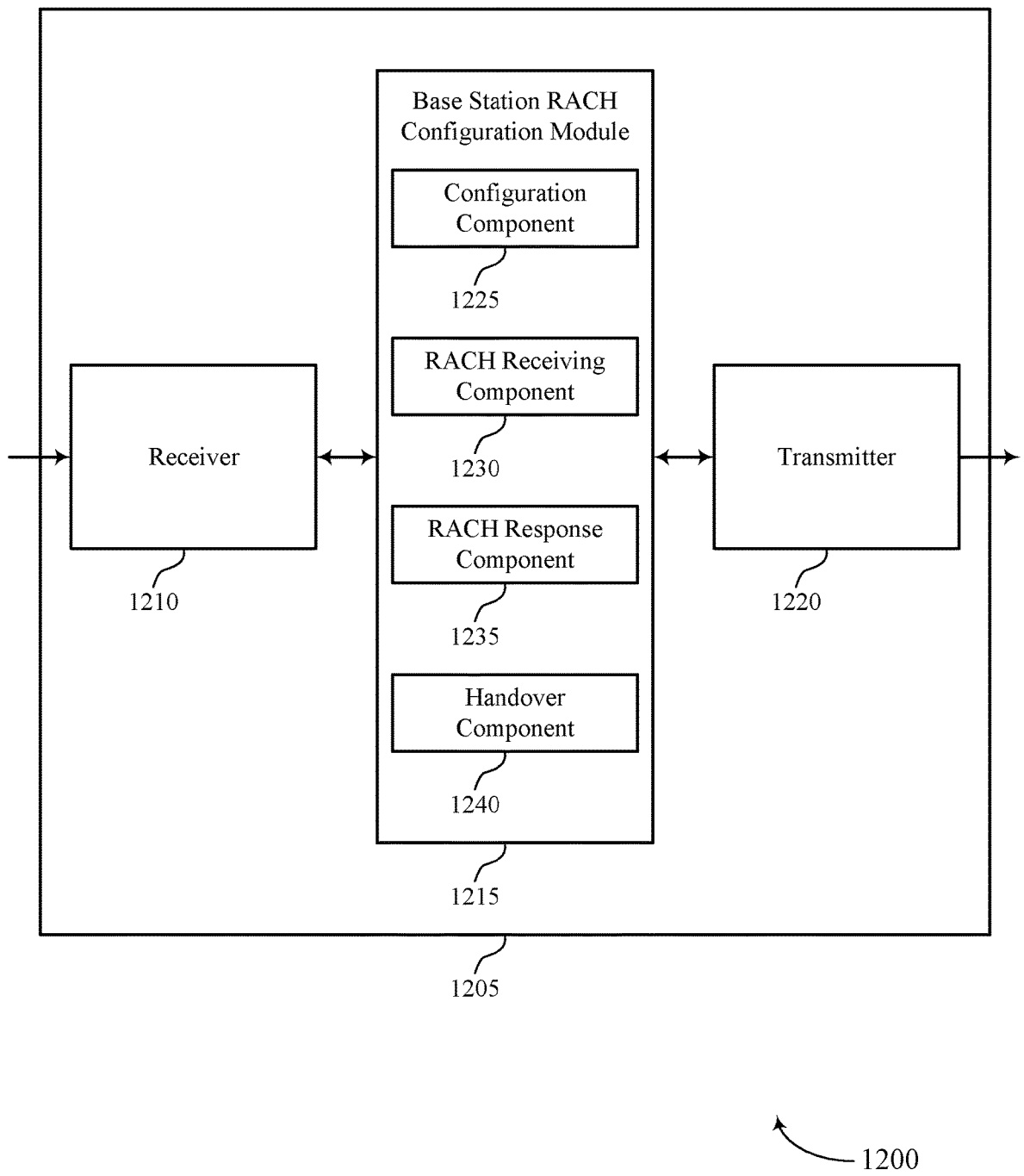

FIG. 12 shows a block diagram 1200 of a wireless device 1205 in accordance with aspects of the present disclosure. Wireless device 1205 may be an example of aspects of a wireless device 1105 or a base station 105 as described with reference to FIG. 11. Wireless device 1205 may include receiver 1210, base station RACH configuration module 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to different configurations for message content and transmission in a random access procedure, etc.). Information may be passed on to other components of the device. The receiver 1210 may be an example of aspects of the transceiver 1435 described with reference to FIG. 14. The receiver 1210 may utilize a single antenna or a set of antennas.

Base station RACH configuration module 1215 may be an example of aspects of the base station RACH configuration module 1415 described with reference to FIG. 14. Base station RACH configuration module 1215 may also include configuration component 1225, RACH receiving component 1230, RACH response component 1235, and handover component 1240.

In a first aspect, configuration component 1225 may transmit, to a UE, a first RACH transmission parameter for a CFRA procedure that differs from a second RACH transmission parameter for a CBRA procedure. RACH receiving component 1230 may receive, based on the first RACH transmission parameter, a RACH message in the CFRA procedure. RACH response component 1235 may transmit a random access response based on the RACH message.

More specifically, configuration component 1225 may transmit, to a UE, a first RACH transmission parameter for a CFRA procedure that differs from a second RACH transmission parameter for a CBRA procedure. In some cases, configuration component 1225 may configure the UE with content for a RACH message and a transmission parameter. Additionally or alternatively, configuration component 1225 may receive, from a target base station, an indication of content for a RACH message and a transmission parameter, and transmit, to the UE, a configuration message indicating the content for the RACH message and the transmission parameter. In some cases, configuring the UE further includes configuring the UE with the CFRA resource. In some cases, the configuration message is an example of a handover command message.

RACH receiving component 1230 may receive, based on the transmission parameter (e.g., the first RACH transmission parameter), the RACH message in a random access procedure. RACH response component 1235 may transmit a random access response based on the RACH message.

Handover component 1240 may determine to handover a UE from the base station to a target base station. In some cases, handover component 1240 may transmit an indication of a handover decision to the target base station, where receiving the indication of the content for the RACH message and the transmission parameter is based on the indication of the handover decision. Handover component 1240 may receive, from the UE, a first indication of a first cell quality for the base station and second indication of a second cell quality for the target base station, where determining to handover the UE is based on the first cell quality and the second cell quality.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
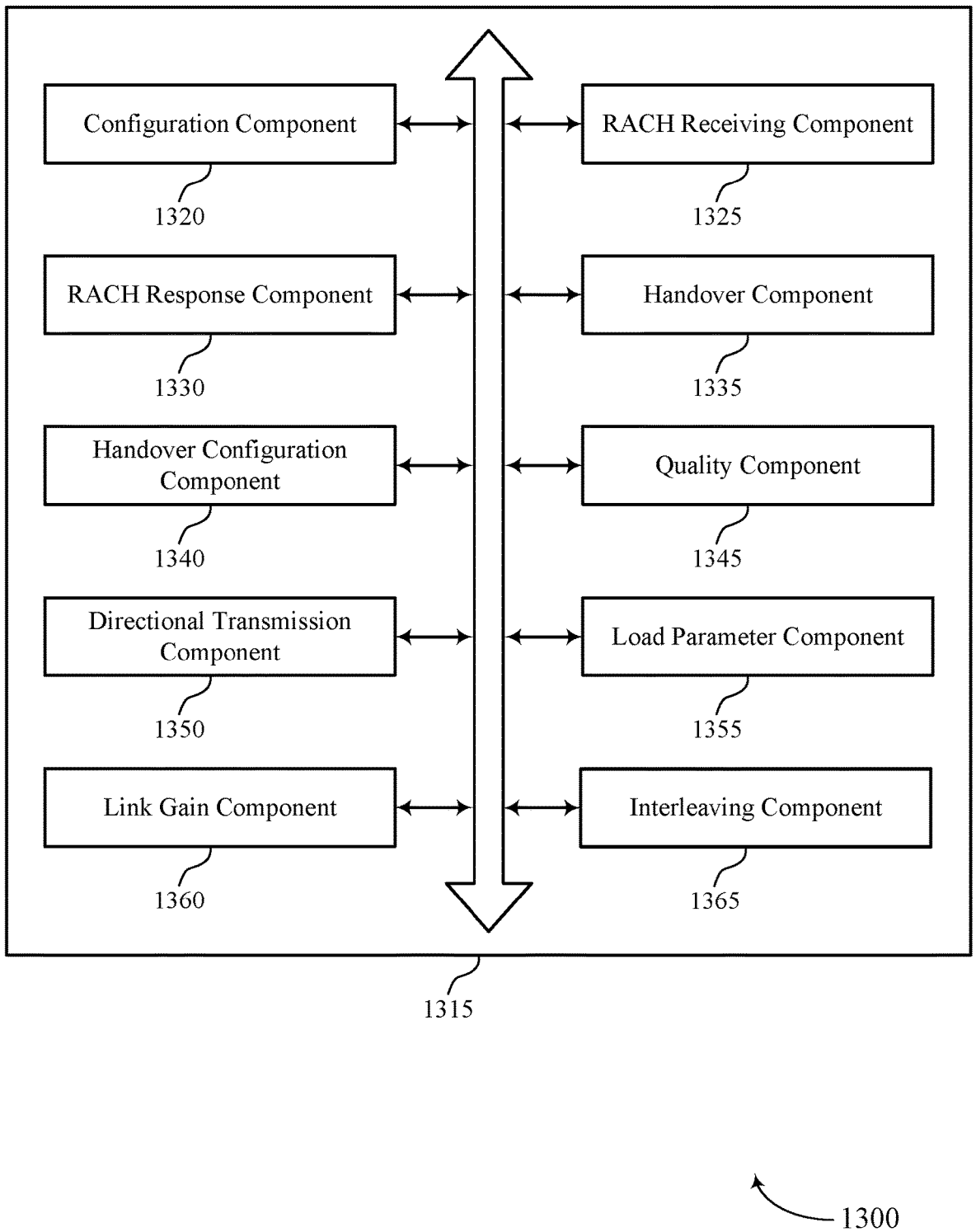

FIG. 13 shows a block diagram 1300 of a base station RACH configuration module 1315 in accordance with aspects of the present disclosure. The base station RACH configuration module 1315 may be an example of aspects of a base station RACH configuration module 1415 described with reference to FIGS. 11, 12, and 14. The base station RACH configuration module 1315 may include configuration component 1320, RACH receiving component 1325, RACH response component 1330, handover component 1335, handover configuration component 1340, cell quality component 1345, directional transmission component 1350, load parameter component 1355, link gain component 1360, and interleaving component 1365. Each of these modules may communicate, directly or indirectly, with one another (e.g., via one or more buses).

Configuration component 1320 may transmit, to a UE, a first RACH transmission parameter for a CFRA procedure that differs from a second RACH transmission parameter for a CBRA procedure. In some cases, configuration component 1320 may configure a UE with content for a RACH message and a transmission parameter. Configuration component 1320 may receive, from a target base station, an indication of content for a RACH message and a transmission parameter and may transmit, to the UE, a configuration message indicating the content for the RACH message and the transmission parameter. In some cases, configuring the UE further includes configuring the UE with the CFRA resource. In some cases, the configuration message is a handover command message.

Additionally or alternatively, configuration component 1320 may transmit, to a UE, a configuration message for a RACH message and a first transmission parameter for a CFRA procedure that differs from a second transmission parameter for a CBRA procedure. In some cases, the configuration message may identify a first subset of a set of RACH preambles for the CFRA procedure that differs from a second subset of the set of RACH preambles for a CBRA procedure. In some cases, the first transmission parameter for the CFRA procedure may correspond to a dedicated RACH preamble within a dedicated time and frequency resource and may differ from a third transmission parameter for a CFRA procedure corresponding to a dedicated RACH preamble within a common time and frequency resource.

In some examples, the first transmission parameter may correspond to a dedicated RACH preamble within a dedicated time and frequency resource that is associated with a first SSB, while the second transmission parameter may correspond to a dedicated RACH preamble within a common time and frequency resource that is associated with a second SSB. In some examples, the first transmission parameter may correspond to a dedicated RACH preamble within a dedicated time and frequency resource that is associated with a first CSI-RS, while the second transmission parameter may correspond to a dedicated RACH preamble within a common time and frequency resource that is associated with a second CSI-RS.

In some cases, the first RACH transmission parameter may indicate a root sequence, or a random access response search space, or a random access response CORESET, or restricted set configurations, or a subcarrier spacing for the RACH message, or an RSRP threshold for selecting an SSB, or an RSRP threshold for selecting a CSI-RS, or any combination thereof. Furthermore, in some cases, the first RACH transmission parameter may indicate a PRACH configuration index, a number of RACH transmission opportunities available for frequency division multiplexing in a single time instance, a frequency offset of a lowest RACH transmission occasion, a zero correlation zone configuration, a RACH received target power, a maximum number of RACH preamble retransmissions, power ramping step for RACH preamble retransmissions, a random access response window length, or some combination thereof.

RACH receiving component 1325 may receive, based on the transmission parameter (e.g., the first RACH transmission parameter), the RACH message in a random access procedure. For example, RACH receiving component 1325 may receive the RACH message in a CFRA procedure, in a dedicated time and frequency resource, in a directional transmission, or in some combination thereof. In some cases, RACH receiving component 1325 may receive, based on the first transmission parameter, the RACH message in the CFRA procedure. In some cases, the RACH message may be received within a dedicated time and frequency resource. In some cases, the RACH message may be an example of a RACH Msg1 or a RACH preamble.

RACH response component 1330 may transmit a random access response based on the RACH message. In some cases, RACH response component 1330 may select a downlink directional transmission from a set of different downlink directional transmissions based on the at least one beam index, where transmitting the random access response involves transmitting the random access response using the selected downlink directional transmission. In some cases, RACH response component 1330 may determine at least one parameter associated with the random access response based on a beam quality report included in the RACH message or determine at least one parameter associated with the random access response based on a beam index included in the RACH message. In some cases, RACH response component 1330 may determine the at least one parameter by determining a TTI within a set of different TTIs in which the UE transmitted the RACH message, determining a beam index corresponding to the determined TTI, and selecting a downlink transmission beam that corresponds to one of either the beam index included in the RACH message or the beam index corresponding to the determined TTI. In some cases, RACH response component 1330 may select the downlink transmission beam based on a defined rule.

Handover component 1335 may determine to handover a UE from the base station to a target base station. In some cases, handover component 1335 may transmit an indication of a handover decision to the target base station, where receiving the indication of the content for the RACH message and the transmission parameter is based on the indication of the handover decision. In some cases, handover component 1335 may receive, from the UE, a first indication of a first cell quality for the base station and second indication of a second cell quality for the target base station, where determining to handover the UE is based on the first cell quality and the second cell quality.

Handover configuration component 1340 may receive an indication of a handover decision from the serving base station, where transmitting the indication of the content and the transmission parameter is based on the handover decision. In some cases, configuring the UE includes transmitting an indication of the content and the transmission parameter to a serving base station of the UE for transmission of the indication of the content and the transmission parameter to the UE.

Quality component 1345 may receive one or more cell quality reports for the UE, determine the transmission parameter based on the one or more cell quality reports, derive a transmission power based on the one or more cell quality reports, and select the transmission parameter corresponding to the derived transmission power. In some cases, the one or more cell quality reports include beam quality measurements for a set of different beams of the base station. In some cases (e.g., if the content specifies to include a quality report in the RACH message), quality component 1345 may process the RACH message to identify the quality report. The quality report may be an example of a beam quality report or a cell quality report. A beam quality report may include at least one of an RSRP, or an RSRQ, or an RSSI, or a CQI, or an SNR, or an SINR, or any combination thereof, for one or more beams. A beam of the one or more beams may include an SS transmitted within an SSB, or a CSI-RS, or an MRS. The SS may be an example of a PSS, or an SSS, or a PBCH signal, or a DMRS of a PBCH signal, or any combination thereof. In some cases (e.g., if the random access response includes an uplink message parameter that corresponds to the quality report), quality component 1345 may receive an uplink message in accordance with the uplink message parameter. In some cases, the uplink message parameter may be an example of at least one of scheduling for the uplink message, or a modulation and coding scheme for the uplink message, or a power control parameter for the uplink message, or any combination thereof.

Directional transmission component 1350 may select a downlink directional transmission from a set of different downlink directional transmissions based on the at least one index, where transmitting the random access response includes transmitting the random access response using the selected downlink directional transmission.

Load parameter component 1355 may determine a load parameter for a set of different directional transmissions, where the transmission parameter indicates a transmission power for transmitting the RACH message based on the load parameter. Link gain component 1360 may determine a link gain of the UE and select a number of bits for the RACH message based on the link gain, where the content identifies the number of bits for the RACH message.

Interleaving component 1365 may determine an interleaving pattern of a random access response window based on one of a first beam index included in the RACH message or a second beam index corresponding to a TTI in which the RACH was transmitted, where transmitting the random access response may involve transmitting the random access response within the random access response window based on the interleaving pattern. In some cases, interleaving component 1365 may transmit at least one of an MIB, or an SIB, or RMSI, or a handover message, or any combination thereof, to indicate the interleaving pattern of the random access response window for configuring the UE with the interleaving pattern. In some cases, transmitting the random access response may include transmitting the random access response within a first portion of the random access response window, or within a second portion of the random access window, or in both of the first and second portions of the random access window.

Figure 14:
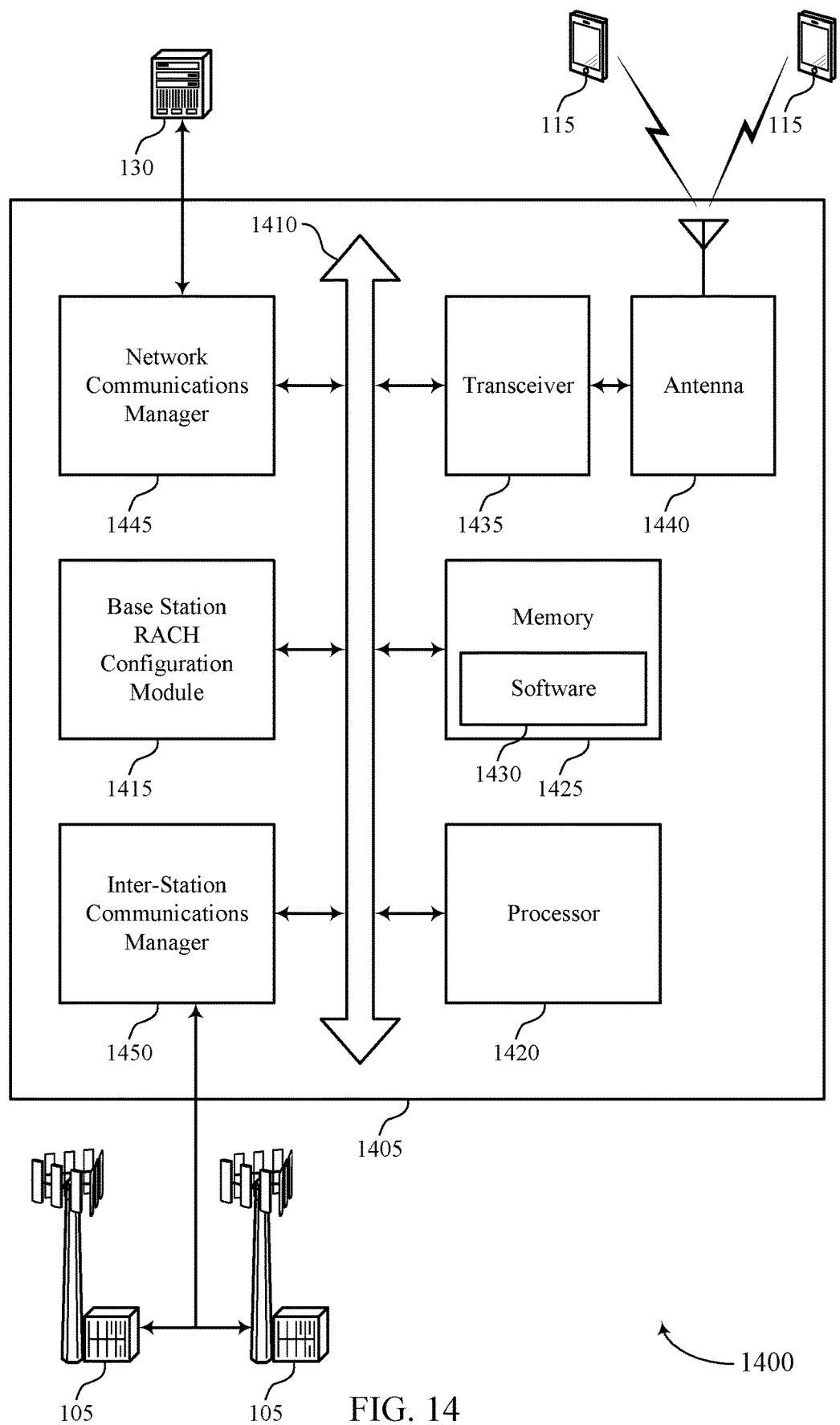
FIG. 14 illustrates a block diagram of a system including a base station in accordance with aspects of the present disclosure.

FIG. 14 shows a diagram of a system 1400 including a device 1405 in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station RACH configuration module 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting different configurations for message content and transmission in a random access procedure).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support different configurations for message content and transmission in a random access procedure. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105 and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
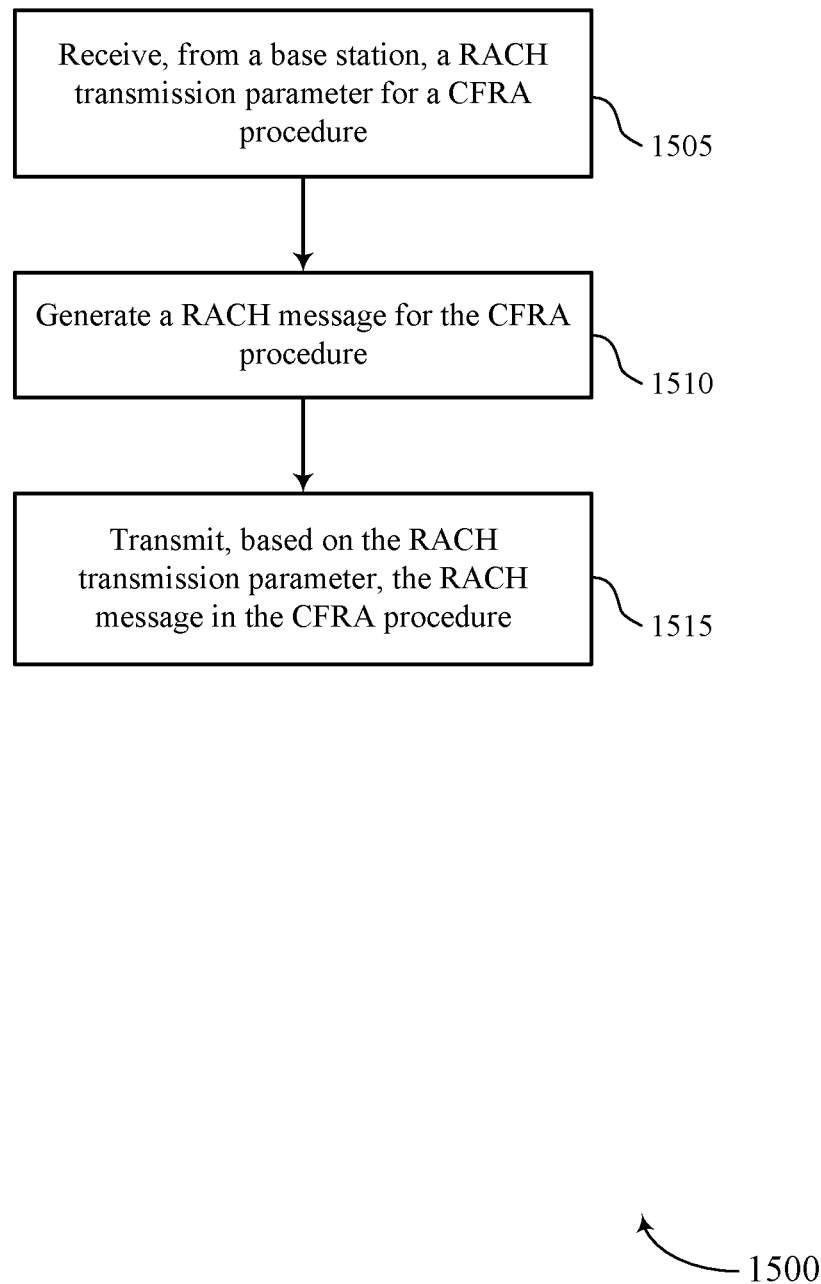
FIGS. 15 through 20 illustrate methods for configuring RACH transmission parameters for different random access procedures in accordance with aspects of the present disclosure.

FIG. 15 shows a flowchart illustrating a method 1500 for configuring RACH transmission parameters for different random access procedures in accordance with aspects of the present disclosure. The operations of method 1500 may be implemented by a UE 115 or its components as described herein. For example, the operations of method 1500 may be performed by a UE RACH configuration module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, from a base station, a RACH transmission parameter for a CFRA procedure. This RACH transmission parameter may be an example of a first RACH transmission parameter, where the first RACH transmission parameter for the CFRA procedure differs from a second RACH transmission parameter for a CBRA procedure (e.g., where the first RACH transmission parameter and the second RACH transmission parameter indicate different values for a same RACH transmission variable or component, such as different values for a PRACH configuration index). In some cases, the RACH transmission parameter may be received as part of a configuration message for a RACH message. The operations of block 1505 may be performed according to the methods described herein. In certain examples, aspects of the operations of block 1505 may be performed by a configuration component as described with reference to FIGS. 7 through 10.

At block 1510 the UE 115 may generate a RACH message for the CFRA procedure. In some cases, the RACH message may be generated based on the received configuration message. The operations of block 1510 may be performed according to the methods described herein. In certain examples, aspects of the operations of block 1510 may be performed by a RACH generator as described with reference to FIGS. 7 through 10.

At block 1515 the UE 115 may transmit, based at least in part on the RACH transmission parameter, the RACH message in the CFRA procedure. For example, the UE 115 may transmit the RACH message within a dedicated time and frequency resource for the CFRA procedure. The operations of block 1515 may be performed according to the methods described herein. In certain examples, aspects of the operations of block 1515 may be performed by a RACH transmission component as described with reference to FIGS. 7 through 10.

Figure 16:
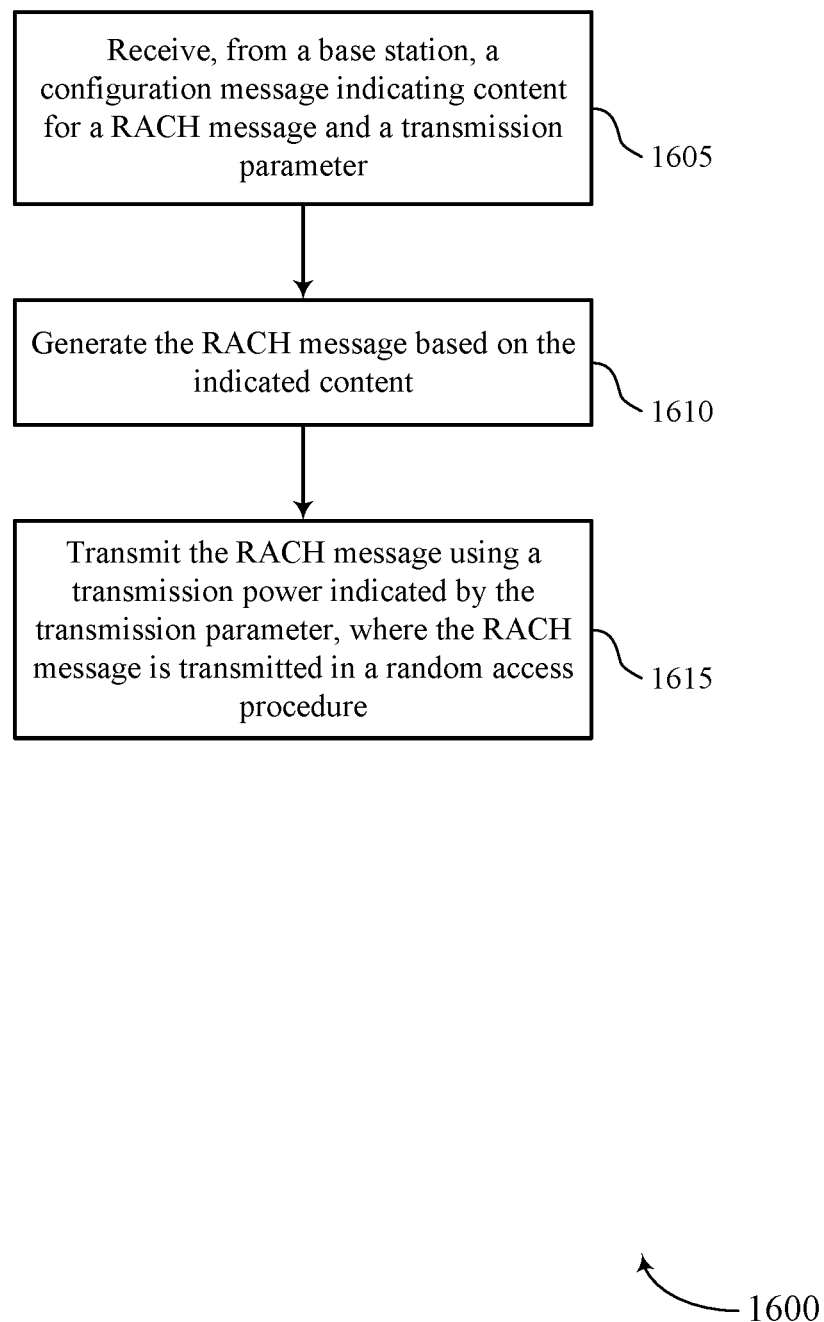

FIG. 16 shows a flowchart illustrating a method 1600 for configuring RACH transmission parameters for different random access procedures in accordance with aspects of the present disclosure. The operations of method 1600 may be implemented by a UE 115 or its components as described herein. For example, the operations of method 1600 may be performed by a UE RACH configuration module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station, a configuration message indicating content for a RACH message and a transmission parameter. The operations of block 1605 may be performed according to the methods described herein. In certain examples, aspects of the operations of block 1605 may be performed by a configuration component as described with reference to FIGS. 7 through 10.

At block 1610 the UE 115 may generate the RACH message based at least in part on the indicated content. The operations of block 1610 may be performed according to the methods described herein. In certain examples, aspects of the operations of block 1610 may be performed by a RACH generator as described with reference to FIGS. 7 through 10.

At block 1615 the UE 115 may transmit the RACH message using a transmission power indicated by the transmission parameter, where the RACH message is transmitted in a random access procedure. For example, the UE 115 may transmit the RACH message in a directional transmission within a dedicated time and frequency resource for a CFRA procedure. The operations of block 1615 may be performed according to the methods described herein. In certain examples, aspects of the operations of block 1615 may be performed by a RACH transmission component as described with reference to FIGS. 7 through 10.

Figure 17:
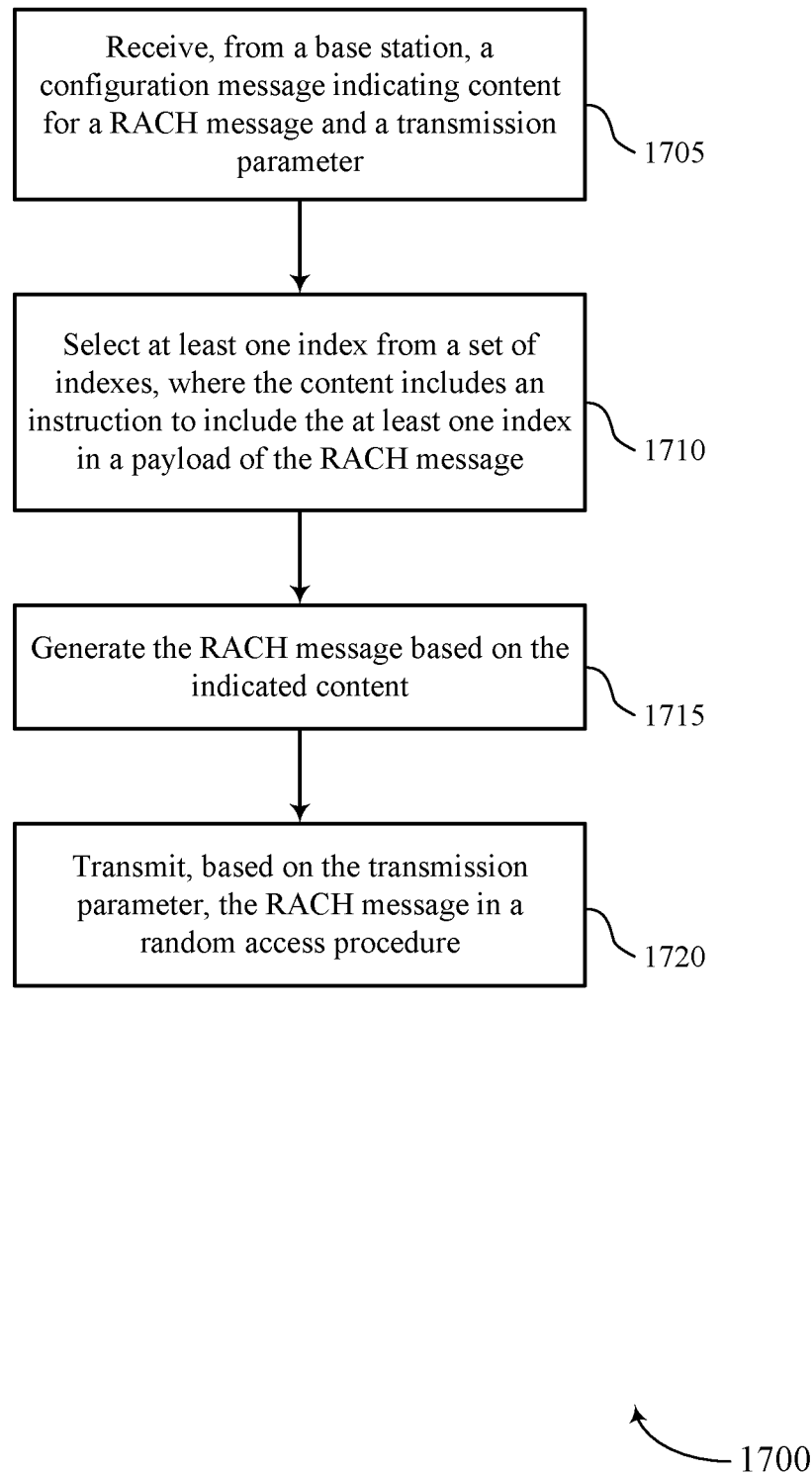

FIG. 17 shows a flowchart illustrating a method 1700 for configuring RACH transmission parameters for different random access procedures in accordance with aspects of the present disclosure. The operations of method 1700 may be implemented by a UE 115 or its components as described herein. For example, the operations of method 1700 may be performed by a UE RACH configuration module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, from a base station, a configuration message indicating content for a RACH message and a transmission parameter. The operations of block 1705 may be performed according to the methods described herein. In certain examples, aspects of the operations of block 1705 may be performed by a configuration component as described with reference to FIGS. 7 through 10.

At block 1710 the UE 115 may select at least one index from a set of indexes, where the content includes an instruction to include the at least one index in a payload of the RACH message. The operations of block 1710 may be performed according to the methods described herein. In certain examples, aspects of the operations of block 1710 may be performed by an index selection component as described with reference to FIGS. 7 through 10.

At block 1715 the UE 115 may generate the RACH message based on the indicated content. The operations of block 1715 may be performed according to the methods described herein. In certain examples, aspects of the operations of block 1715 may be performed by a RACH generator as described with reference to FIGS. 7 through 10.

At block 1720 the UE 115 may transmit, based on the transmission parameter, the RACH message in a random access procedure. For example, the UE 115 may transmit the RACH message in a directional transmission within a dedicated time and frequency resource for a CFRA procedure. The operations of block 1720 may be performed according to the methods described herein. In certain examples, aspects of the operations of block 1720 may be performed by a RACH transmission component as described with reference to FIGS. 7 through 10.

Figure 18:
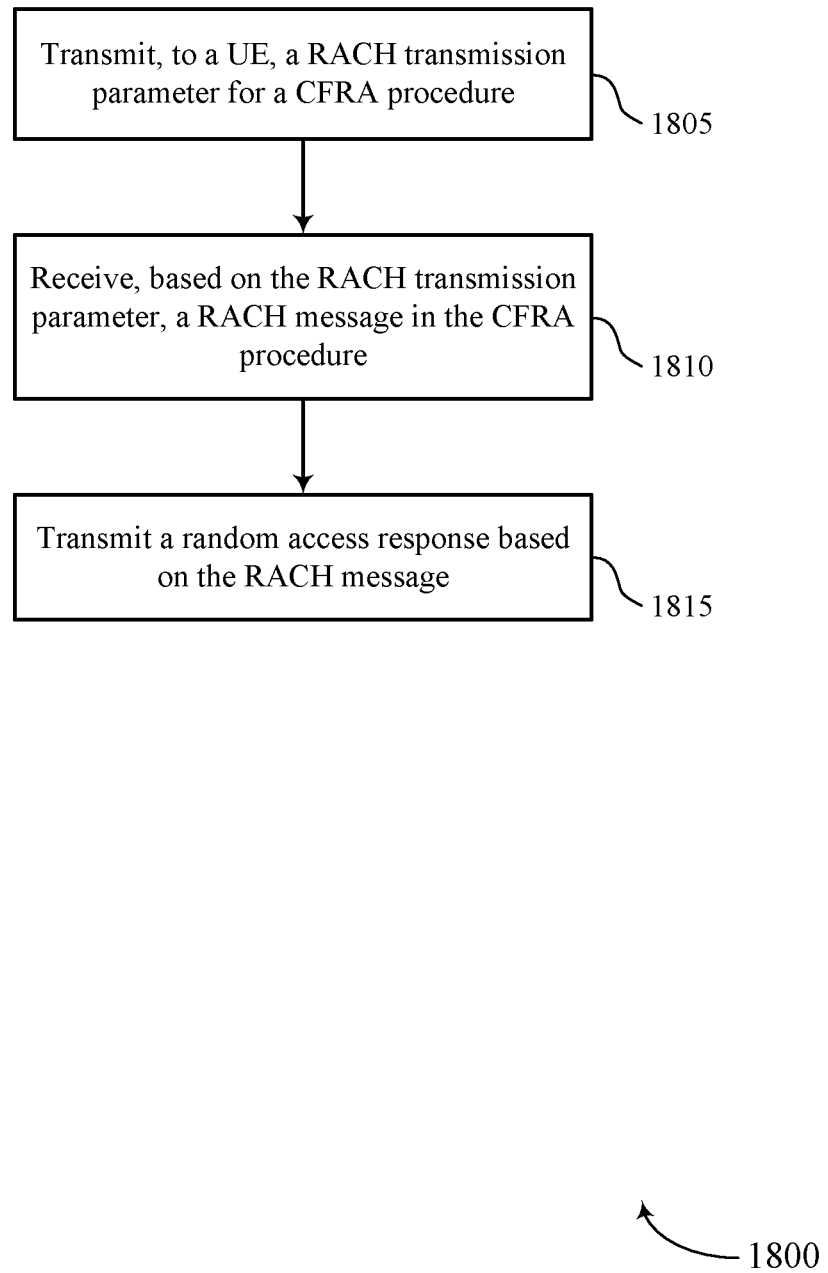

FIG. 18 shows a flowchart illustrating a method 1800 for configuring RACH transmission parameters for different random access procedures in accordance with aspects of the present disclosure. The operations of method 1800 may be implemented by a base station 105 or its components as described herein. For example, the operations of method 1800 may be performed by a base station RACH configuration module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit, to a UE 115, a RACH transmission parameter for a CFRA procedure. This RACH transmission parameter may be an example of a first RACH transmission parameter, where the first RACH transmission parameter for the CFRA procedure differs from a second RACH transmission parameter for a CBRA procedure (e.g., where the first RACH transmission parameter and the second RACH transmission parameter indicate different values for a same RACH transmission variable or parameter, such as different values for a PRACH configuration index). In some cases, the base station 105 may transmit a configuration message for a RACH message that indicates the RACH transmission parameter. The operations of block 1805 may be performed according to the methods described herein. In certain examples, aspects of the operations of block 1805 may be performed by a configuration component as described with reference to FIGS. 11 through 14.

At block 1810 the base station 105 may receive, from the UE 115 and based at least in part on the RACH transmission parameter (e.g., the first RACH transmission parameter), a RACH message in the CFRA procedure. The operations of block 1810 may be performed according to the methods described herein. In certain examples, aspects of the operations of block 1810 may be performed by a RACH receiving component as described with reference to FIGS. 11 through 14.

At block 1815 the base station 105 may transmit, to the UE 115, a random access response based at least in part on the received RACH message (e.g., a random access response message in response to the RACH message). The operations of block 1815 may be performed according to the methods described herein. In certain examples, aspects of the operations of block 1815 may be performed by a RACH response component as described with reference to FIGS. 11 through 14.

Figure 19:
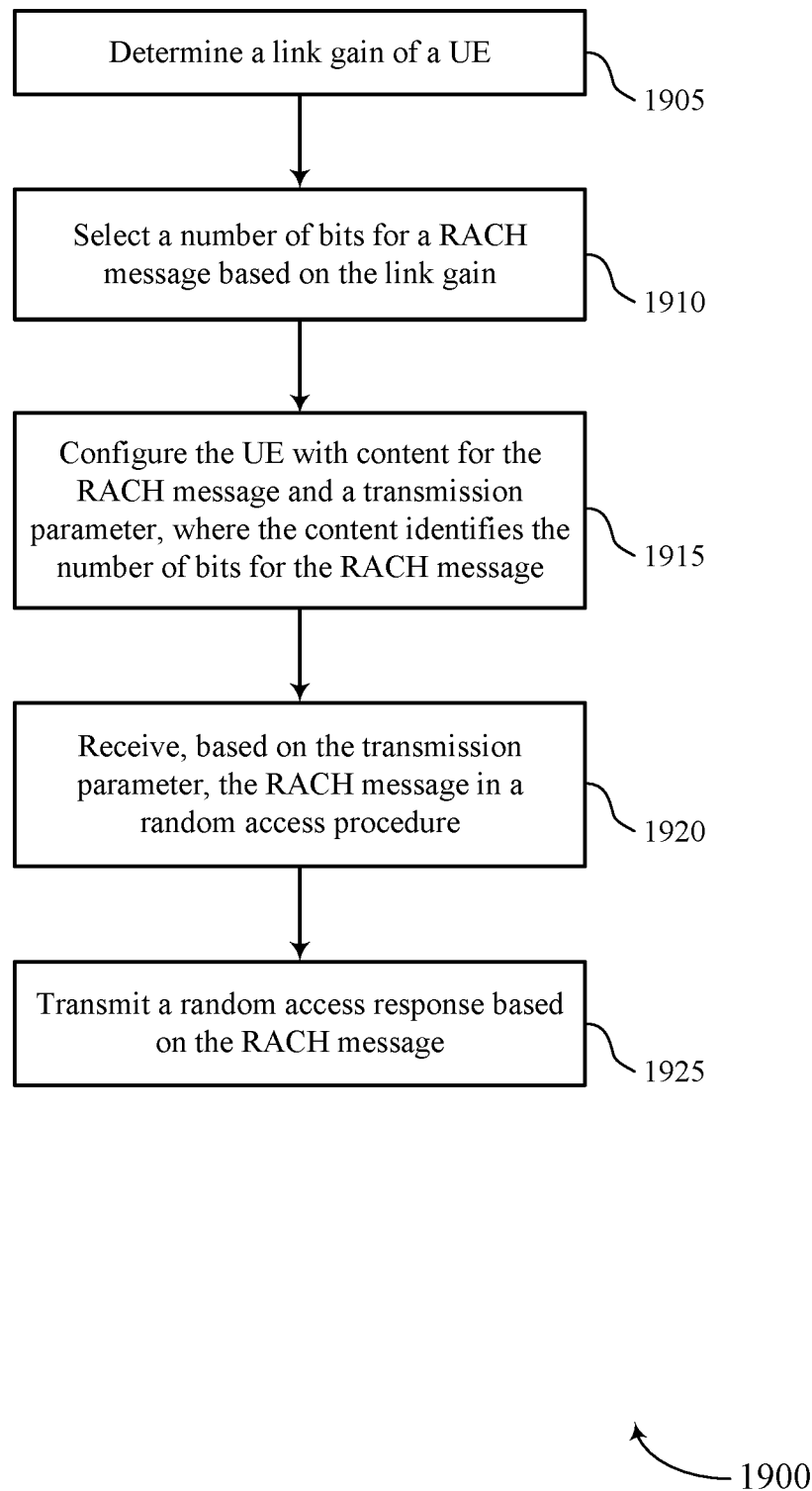

FIG. 19 shows a flowchart illustrating a method 1900 for configuring RACH transmission parameters for different random access procedures in accordance with aspects of the present disclosure. The operations of method 1900 may be implemented by a base station 105 or its components as described herein. For example, the operations of method 1900 may be performed by a base station RACH configuration module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may determine a link gain of a UE. The operations of block 1905 may be performed according to the methods described herein. In certain examples, aspects of the operations of block 1905 may be performed by a link gain component as described with reference to FIGS. 11 through 14.

At block 1910 the base station 105 may select a number of bits for a RACH message based on the link gain. The operations of block 1910 may be performed according to the methods described herein. In certain examples, aspects of the operations of block 1910 may be performed by a link gain component as described with reference to FIGS. 11 through 14.

At block 1915 the base station 105 may configure the UE with content for a RACH message and a transmission parameter, where the content identifies the number of bits for the RACH message. The operations of block 1915 may be performed according to the methods described herein. In certain examples, aspects of the operations of block 1915 may be performed by a configuration component as described with reference to FIGS. 11 through 14.

At block 1920 the base station 105 may receive, based on the transmission parameter, the RACH message in a random access procedure. For example, the base station 105 may receive the RACH message in a directional transmission within a dedicated time and frequency resource for a CFRA procedure. The operations of block 1920 may be performed according to the methods described herein. In certain examples, aspects of the operations of block 1920 may be performed by a RACH receiving component as described with reference to FIGS. 11 through 14.

At block 1925 the base station 105 may transmit a random access response based on the RACH message. The operations of block 1925 may be performed according to the methods described herein. In certain examples, aspects of the operations of block 1925 may be performed by a RACH response component as described with reference to FIGS. 11 through 14.

Figure 20:
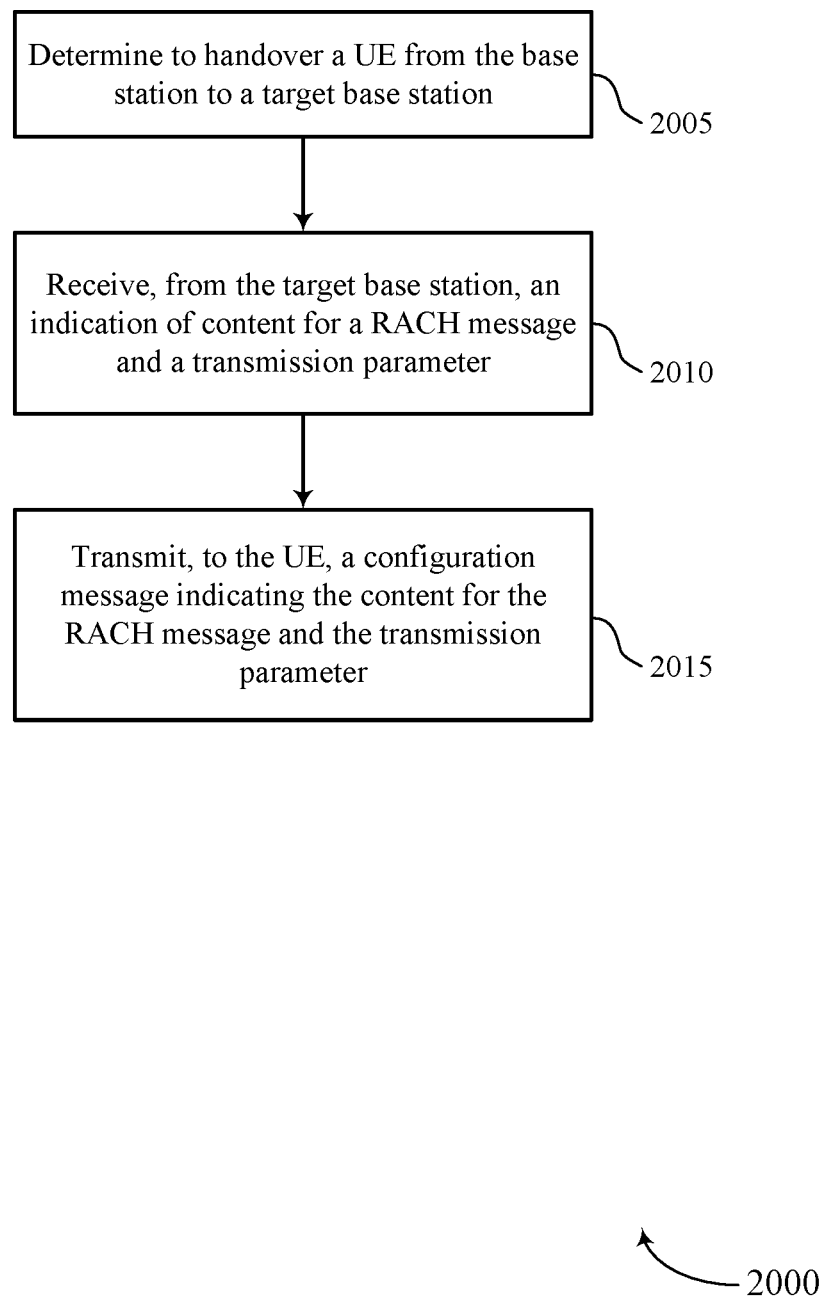

FIG. 20 shows a flowchart illustrating a method 2000 for configuring RACH transmission parameters for different random access procedures in accordance with aspects of the present disclosure. The operations of method 2000 may be implemented by a base station 105 or its components as described herein. For example, the operations of method 2000 may be performed by a base station RACH configuration module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may determine to handover a UE from the base station to a target base station. The operations of block 2005 may be performed according to the methods described herein. In certain examples, aspects of the operations of block 2005 may be performed by a handover component as described with reference to FIGS. 11 through 14.

At block 2010 the base station 105 may receive, from the target base station, an indication of content for a RACH message and a transmission parameter. The operations of block 2010 may be performed according to the methods described herein. In certain examples, aspects of the operations of block 2010 may be performed by a configuration component as described with reference to FIGS. 11 through 14.

At block 2015 the base station 105 may transmit, to the UE, a configuration message indicating the content for the RACH message and the transmission parameter. The operations of block 2015 may be performed according to the methods described herein. In certain examples, aspects of the operations of block 2015 may be performed by a configuration component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively to execute the code to cause the UE to:
   receive a first random access channel (RACH) transmission parameter for a contention-free random access (CFRA) procedure,
   wherein the first RACH transmission parameter includes a first transmission power parameter for the CFRA procedure,
   wherein the first transmission power parameter indicates a first RACH received target power or a first transmission power for the CFRA procedure,
   wherein a second transmission power parameter indicates a second RACH received target power or a second transmission power for a contention-based random access (CBRA procedure), and
   wherein a first value of the first transmission power parameter for the CFRA procedure is separate from a second value of the second transmission power parameter for the CBRA procedure;
   receive an indication of first dedicated resources for the CFRA procedure;
   receive an indication of second common resources for the CBRA procedure; and
   transmit, based at least in part on the first RACH transmission parameter, a RACH message in the CFRA procedure.

2. The UE of claim 1, wherein, to transmit the RACH message, the one or more processors individually or collectively to execute the code to cause the UE to:
   transmit the RACH message within the first dedicated resources.

3. The UE of claim 2, wherein, to transmit the RACH message, the one or more processors individually or collectively to execute the code to cause the UE to:
   transmit the RACH message in a directional transmission.

4. The UE of claim 2, wherein the first RACH transmission parameter indicates a first assigned tone spacing for RACH message transmission within the first dedicated resources that is different from a second assigned tone spacing for RACH message transmission within the second common resources, and wherein, to transmit the RACH message, the one or more processors individually or collectively to execute the code to cause the UE to:
   transmit the RACH message using the first assigned tone spacing.

5. The UE of claim 1, wherein the first RACH transmission parameter indicates a physical RACH (PRACH) configuration index.

6. The UE of claim 1, wherein the first RACH transmission parameter indicates the first RACH received target power.

7. The UE of claim 1, wherein the first RACH transmission parameter indicates a maximum number of RACH preamble retransmissions.

8. The UE of claim 1, wherein the first RACH transmission parameter indicates a random access response window length.

9. The UE of claim 1, wherein, to receive the first RACH transmission parameter, the one or more processors individually or collectively to execute the code to cause the UE to:
receive a configuration message for the RACH message, wherein the configuration message indicates the first RACH transmission parameter.

10. The UE of claim 1, wherein:
the first RACH transmission parameter for the CFRA procedure corresponds to a first dedicated RACH preamble associated with the first dedicated resources; and
the first RACH transmission parameter differs from a third RACH transmission parameter for a CFRA procedure that corresponds to a second dedicated RACH preamble associated with the second common resources.

11. The UE of claim 1, wherein the first RACH transmission parameter corresponds to a dedicated RACH preamble associated with the first dedicated resources that is associated with a first synchronization signal block (SSB), a first channel state information reference signal (CSI-RS), or a combination thereof.

12. The UE of claim 1, wherein the one or more processors individually or collectively to execute the code to cause the UE to:
monitor for a random access response in a random access response window based at least in part on an interleaving pattern.

13. A network entity, comprising:
one or more memories storing processor-executable code; and
one or more processors coupled with the one or more memories and individually or collectively to execute the code to cause the network entity to:
transmit a first random access channel (RACH) transmission parameter for a contention-free random access (CFRA) procedure,
wherein the first RACH transmission parameter includes a first transmission power parameter for the CFRA procedure,
wherein the first transmission power parameter indicates a first RACH received target power or a first transmission power for the CFRA procedure, and
wherein a second transmission power parameter indicates a second RACH received target power or a second transmission power for a contention-based random access (CBRA procedure), and
wherein a first value of the first transmission power parameter for the CFRA procedure is separate from a second value of the second transmission power parameter for the CBRA procedure;
transmit an indication of first dedicated resources for the CFRA procedure;
transmit an indication of second common resources for the CBRA procedure; and
receive, based at least in part on the first RACH transmission parameter, a RACH message in the CFRA procedure.

14. A method for wireless communication by a user equipment (UE), comprising:
receiving a first random access channel (RACH) transmission parameter for a contention-free random access (CFRA) procedure,
wherein the first RACH transmission parameter for the CFRA procedure includes a first transmission power parameter for the CFRA procedure,
wherein the first transmission power parameter indicates a first RACH received target power or a first transmission power for the CFRA procedure,
wherein a second transmission power parameter indicates a second RACH received target power or a second transmission power for a contention-based random access (CBRA procedure), and
wherein a first value of the first transmission power parameter for the CFRA procedure is separate from a second value of the second transmission power parameter for the CBRA procedure;
receiving an indication of first dedicated resources for the CFRA procedure;
receiving an indication of second common resources for the CBRA procedure; and
transmitting, based at least in part on the first RACH transmission parameter, a RACH message in the CFRA procedure.

15. The method of claim 14, wherein transmitting the RACH message in the CFRA procedure comprises:
transmitting the RACH message within the first dedicated resources.

16. The method of claim 15, wherein transmitting the RACH message in the CFRA procedure comprises:
transmitting the RACH message in a directional transmission.

17. The method of claim 15, wherein the first RACH transmission parameter indicates a first assigned tone spacing for RACH message transmission within the first dedicated resources that is different from a second assigned tone spacing for RACH message transmission within the second common resources, and wherein transmitting the RACH message comprises:
transmitting the RACH message using the first assigned tone spacing.

18. The method of claim 14, wherein the first RACH transmission parameter indicates a physical RACH (PRACH) configuration index.

19. The method of claim 14, wherein the first RACH transmission parameter indicates the first RACH received target power.

20. A method for wireless communication by a network entity comprising:
transmitting a first random access channel (RACH) transmission parameter for a contention-free random access (CFRA) procedure,
wherein the first RACH transmission parameter includes a first transmission power parameter for the CFRA procedure,
wherein the first transmission power parameter indicates a first RACH received target power or a first transmission power for the CFRA procedure,
wherein a second transmission power parameter indicates a second RACH received target power or a second transmission power for a contention-based random access (CBRA procedure), and wherein a first value of the first transmission power parameter for the CFRA procedure is separate from a second value of the second transmission power parameter for the CBRA procedure;

transmitting an indication of first dedicated resources for the CFRA procedure;

transmitting an indication of second common resources for the CBRA procedure; and receiving, based at least in part on the first RACH transmission parameter, a RACH message in the CFRA procedure.

\* \* \* \* \*